US005802357A

United States Patent [19]
Li et al.

[11] Patent Number: 5,802,357
[45] Date of Patent: *Sep. 1, 1998

[54] SYSTEM AND METHOD FOR PERFORMING AN EFFICIENT JOIN OPERATION

[75] Inventors: Zhe Li, Berkeley, Calif.; Kenneth A. Ross, New York, N.Y.

[73] Assignee: The Trustees of Columbia University in the City of New York, New York, N.Y.

[*] Notice: The term of this patent shall not extend beyond the expiration date of Pat. No. 5,666,525.

[21] Appl. No.: 632,958

[22] Filed: Apr. 16, 1996

Related U.S. Application Data

[63] Continuation-in-part of Ser. No. 531,789, Sep. 21, 1995.

[51] Int. Cl.⁶ .............................. G06F 17/30; G06F 7/22
[52] U.S. Cl. .................................... 395/602; 395/607
[58] Field of Search ................... 395/601, 602, 395/603, 607, 611, 613

[56] References Cited

U.S. PATENT DOCUMENTS

| | | | |
|---|---|---|---|
| 5,121,494 | 6/1992 | Dias et al. | 395/602 |
| 5,241,648 | 8/1993 | Cheng et al. | 395/607 |
| 5,345,585 | 9/1994 | Iyer et al. | 395/602 |
| 5,408,654 | 4/1995 | Barry | 395/612 |
| 5,557,791 | 9/1996 | Cheng et al. | 395/602 |

OTHER PUBLICATIONS

Kitsuregawa, M., Harada, L., Takagi, M., "Join Stratagies on KD–tree indexed relations", Proceedings Fifth International Conference on Data Engineering, pp. 85–93, Feb. 1989.

Shapiro, "Join Processing in Database Systems with Large Main Memories", *ACM Transactions on Database Systems*, vol. 11, No. 3, Sep. 1986, pp. 239–264.

Valduriez, "Join Indices", *ACM Transactions on Database Systems*, vol. 12, No. 2, Jun. 1987, pp. 218–246.

Desai, "Performance of a Composite Attribute and Join Index", *IEEE Transactions on Software Engineering*, vol. 14, No. 2, Feb. 1989, pp. 142–152.

Blakeley et al., "Join Index, Materialized View, and Hybrid–Hash Join: a Performance Anaylsis", *Sixth International Conference on Data Engineering*, 1990 pp. 256–263.

Mishra et al., "Join Processing in Relational Databases", *ACM Computing Surveys*, vol. 24, No. 1, Mar. 1992, pp. 63–113.

Perrizo et al., "Distributed Join Processing Performance Evaluation", *Proceedings of the Twenty–Seventh Annual Hawaii International Conference on System Sciences*, 1994, pp. 236–245.

D. Knuth, *The Art of Computer Programming*, vol. 3, "Sorting and Searching"; 1973, pp. 247–250.

*Primary Examiner*—Thomas G. Black
*Assistant Examiner*—Jack M. Choules
*Attorney, Agent, or Firm*—Brumbaugh, Graves, Donohue & Raymond

[57] ABSTRACT

A technique for efficiently joining multiple large tables in a database system with a processor using a small main memory. The technique utilizes a join index and minimizes the number of Input/Output operations while maximizing the use of the small main memory through a buffer allocation process. Three embodiments of the technique are described all of which use the parallel-merge operation. The first technique, slam-join, is for joining two tables and does not require any pre-allocation of buffers to perform the join operation. The second technique, multi-slam-join, is for joining three or more tables and adds the parallel-merge technique to a join technique which partitions memory to be used for an efficient join operation. The third technique, called parallel-join, processes each input table completely independently using the parallel-merge technique. The parallel-merge technique identifies the lowest value from multiple files and orders all the values from lowest to highest. This enables sequential reading of input files saving I/O operations.

66 Claims, 24 Drawing Sheets

FIRST INPUT TABLE 301

|  | STUDENT (301A) | COURSE (301B) |
|---|---|---|
| 1 | SMITH | 101 |
| 2 | SMITH | 109 |
| 3 | JONES | 104 |
| 4 | DAVIS | 102 |
| 5 | DAVIS | 105 |
| 6 | KIRBY | 106 |
| 7 | BROWN | 103 |
| 8 | BLACK | 102 |
| 9 | FRICK | 107 |

SECOND INPUT TABLE 305

|  | COURSE (305A) | INSTRUCTOR (305B) |
|---|---|---|
| 1 | 101 | GREEN |
| 2 | 102 | YELLOW |
| 3 | 103 | GREEN |
| 4 | 104 | WHITE |
| 5 | 105 | EVANS |
| 6 | 106 | ALBERTS |
| 7 | 106 | BEIGE |
| 8 | 108 | RED |
| 9 | 109 | GRAY |

JOIN INDEX

|  | TABLE 301 (303A) | TABLE 305 (303B) |
|---|---|---|
| 1 | 1 | 1 |
| 2 | 2 | 9 |
| 3 | 3 | 4 |
| 4 | 4 | 2 |
| 5 | 5 | 5 |
| 6 | 6 | 7 |
| 7 | 6 | 6 |
| 8 | 7 | 3 |
| 9 | 8 | 2 |

FIG. 3

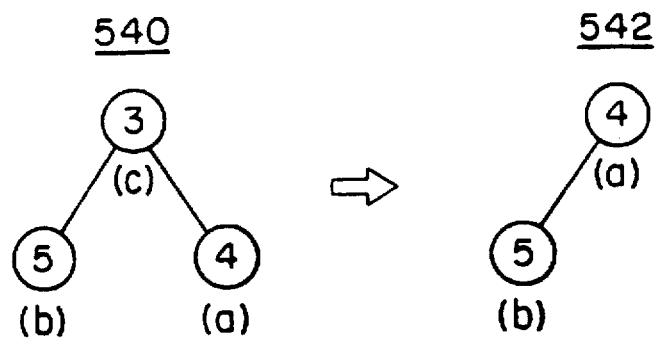
FIG. 5D
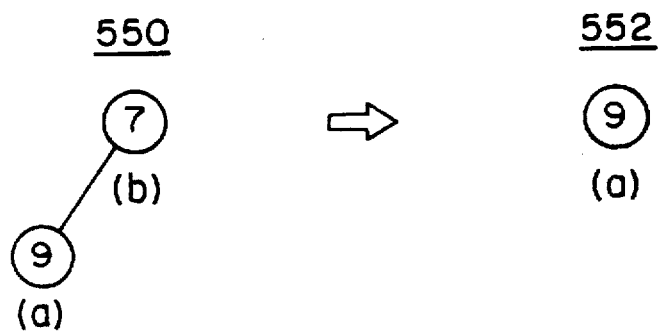
FIG. 5E
| 560 | | 562 |
|---|---|---|
| SMITH | 101 | GREEN |
| JONES | 104 | WHITE |
| SMITH | 109 | GRAY |
| DAVIS | 102 | YELLOW |
| DAVIS | 105 | EVANS |
| KIRBY | 106 | ALBERTS |
| KIRBY | 106 | BEIGE |
| BLACK | 102 | YELLOW |
| BROWN | 103 | GREEN |
FIG. 5F

FIRST INPUT TABLE 701

| | STUDENT | COURSE |
|---|---|---|
| 1 | SMITH | 101 |
| 2 | SMITH | 109 |
| 3 | JONES | 104 |
| 4 | DAVIS | 102 |
| 5 | DAVIS | 105 |
| 6 | DAVIS | 106 |
| 7 | BROWN | 102 |
| 8 | BLACK | 103 |
| 9 | FRICK | 107 |

SECOND INPUT TABLE 703

| | COURSE | INSTRUCTOR | TITLE |
|---|---|---|---|
| 1 | 101 | GREEN | MATH |
| 2 | 102 | YELLOW | PHYSICS |
| 3 | 103 | GREEN | STATISTICS |
| 4 | 104 | WHITE | HISTORY |
| 5 | 105 | EVANS | GEOLOGY |
| 6 | 106 | ALBERTS | ART |
| 7 | 106 | BEIGE | ART |
| 8 | 108 | RED | FRENCH |
| 9 | 109 | GRAY | ENGLISH |

THIRD INPUT TABLE 705

| | INSTRUCTOR | OFFICE |
|---|---|---|
| 1 | ALBERTS | 701 |
| 2 | YELLOW | 407 |
| 3 | WHITE | 501 |
| 4 | WHITE | 402 |
| 5 | GREEN | 401 |
| 6 | RED | 401 |
| 7 | BEIGE | 502 |

JOIN INDEX 707

| | TABLE 701 | TABLE 703 | TABLE 705 |
|---|---|---|---|
| 1 | 1 | 1 | 5 |
| 2 | 3 | 4 | 3 |
| 3 | 3 | 4 | 4 |
| 4 | 4 | 2 | 2 |
| 5 | 6 | 6 | 1 |
| 6 | 6 | 7 | 7 |
| 7 | 7 | 2 | 2 |
| 8 | 8 | 3 | 5 |

FIG. 7

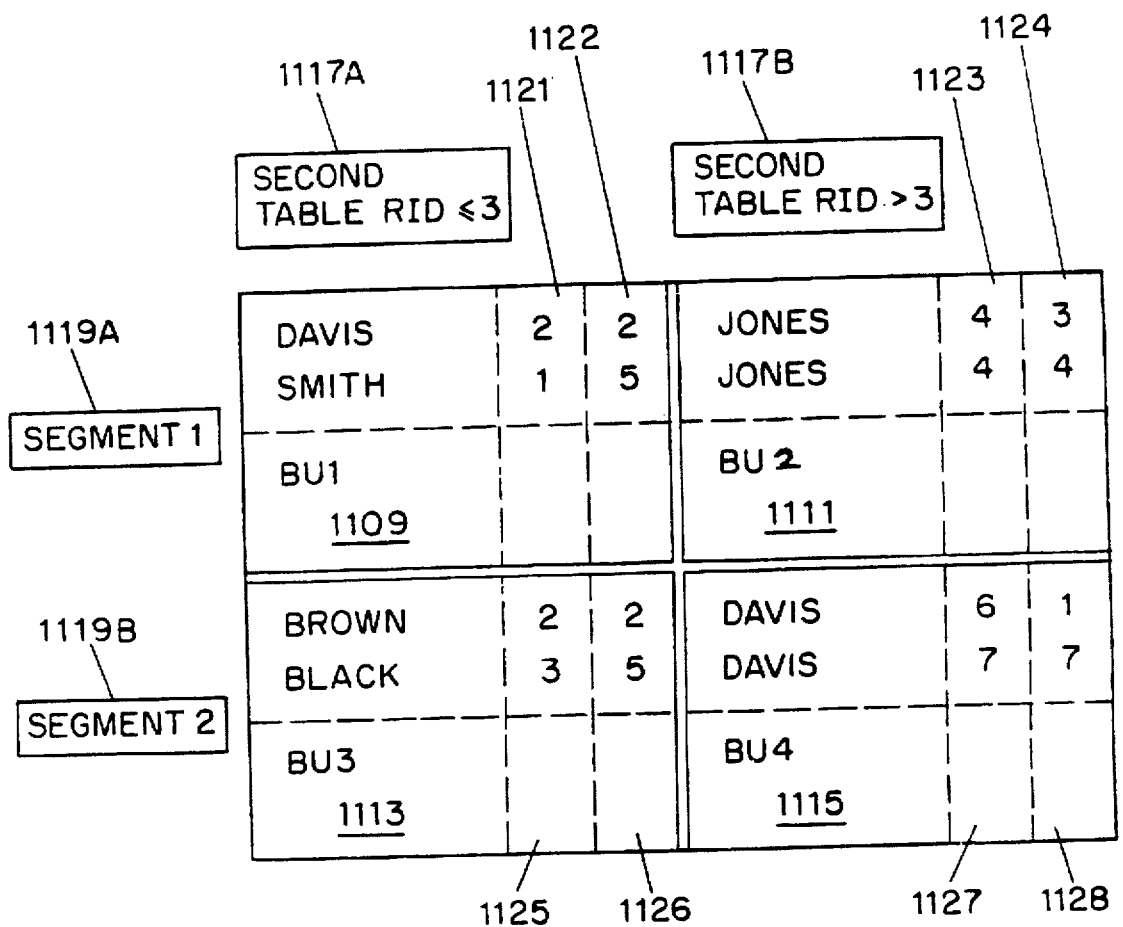
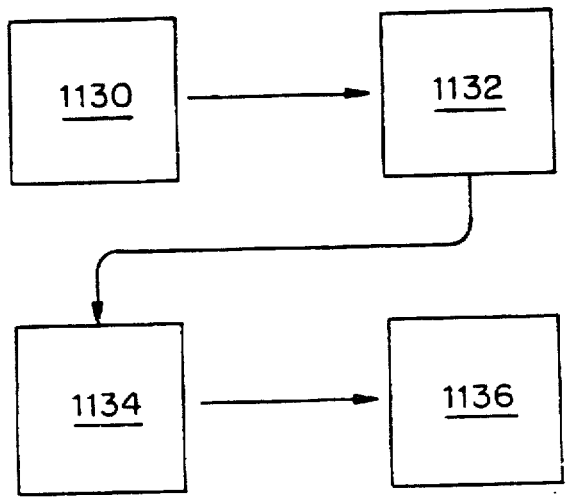
FIG. 11A

| | | |
|---|---|---|
| DAVIS | 102 · YELLOW · PHYSICS | 407 |
| SMITH | 101 · GREEN · MATH | 407 |
| JONES | 104 · WHITE · HISTORY | 501 |
| JONES | 104 · WHITE · HISTORY | 402 |
| BROWN | 102 · YELLOW · PHYSICS | 407 |
| BLACK | 103 · GREEN · STATISTICS | 401 |
| DAVIS | 106 · ALBERTS · ART | 701 |
| DAVIS | 106 · BEIGE · ART | 502 |

| | COURSE | STUDENT |
|---|---|---|
| 1 | 101 | SMITH |
| 2 | 103 | JONES |
| 3 | 102 | DAVIS |
| 4 | 105 | BROWN |

1201

| | COURSE | INSTRUCTOR |
|---|---|---|
| 1 | 102 | GREEN |
| 2 | 106 | YELLOW |
| 3 | 105 | WHITE |
| 4 | 111 | EVANS |
| 5 | 103 | ALBERTS |
| 6 | 102 | BEIGE |

SYSTEM AND METHOD FOR PERFORMING AN EFFICIENT JOIN OPERATION

SPECIFICATION

This application is a continuation-in-part of U.S. application Ser. No. 08/531,789 entitled SYSTEM AND METHOD FOR PERFORMING AN EFFICIENT JOIN OPERATION ON LARGE TABLES WITH A SMALL MAIN MEMORY filed on Sep. 21, 1995. The disclosure of the aforementioned U.S. patent application Ser. No. 08/531,789 (the "parent application") is hereby incorporated by reference.

The United States Government has certain rights in this invention pursuant to awards IRI-9209029 and CDA-90-24735 by the National Science Foundation.

FIELD OF INVENTION

The present invention is directed towards an efficient join operation in a database system, and more specifically toward joining tables containing a large amount of data using a join index in a system with a relatively small amount of main memory. In each embodiment of the invention, a parallel-merge operation is used as part of the technique.

BACKGROUND OF THE INVENTION

The "join" operation used in database systems is the fundamental operation that allows information from different data tables to be combined in a selected way. Tables consist of collections of data grouped by a common subject matter, such as names or ages. The join operation allows a user to combine selected groups of data from multiple input data tables according to a specified condition between the records in each table to be combined. For example, a user may want join two tables, the first containing names and telephone numbers, and the second containing names and addresses, to produce a result which contains all the records that include common names between the two tables with both their telephone numbers and addresses. The join operation is used during a "query", or data request operation, by the user of a database system. Join operations are typically expensive in terms of processing time making efficiency a critical component to performance of the database system.

In some cases, tables of data will be very small relative to the amount of main memory (also called random access memory or "RAM") of the computer in the data base system. An example of a relatively small table is one that contains data of 30 students names and their quarterly grades. Tables are normally organized by columns of related data. In this case, all the names would appear in one column entitled "Names". In this example of 30 records, the entire table can be read into a typical main memory of a computer in one operation and can be completely processed while contained in RAM.

Other applications have input data tables that are significantly larger than the storage capacity of available main memory of the processor. These applications need to process huge amounts of information very quickly to keep up with vast amounts of input data. Examples of these applications are NASA's Earth Observing System, with an estimated one terabyte of data to be processed per day, and data mining applications which contain massive amounts of transaction information. As technology advances, more and more tables of large amounts of data will be needed to be processed in a database platform. Even considering the typical amounts of available RAM storage in large main frame computers, the size of their main memory is significantly smaller than the size of the vast input tables of data described above. In order to process such large amounts of data using a database system, efficient techniques for joining large relations are needed when the processor utilizes a smaller main memory.

Join results from joining input tables can be computed in a number of different ways. The term "ad-hoc join" is used to describe the process of taking two input tables in a database and forming the join result by processing the entire standard representations of each table, without the benefit of any pre-computed special data structures such as indices. When the pre-computed special data structures are present, the join operation will perform more efficiently.

One such pre-computed access structure is called a join index. The join index was introduced by Valduriez in "Join Indices", ACM Transactions on Database Systems, 12(2):218-246, 1987. A join index between two input tables maintains pairs of identifiers for records that would match if a particular join operation is performed. For example, one entry in a join index might be (1,3) which indicates that the record with an identity of "1" in the first table will be joined with the record with an identity of "3" in the second table when a particular join operation is performed. The join index may be maintained by the database system, and updated when records are inserted or deleted in the underlying tables. In situations where joins take place often, the processing cost of maintaining a join index will be small compared to the savings achieved in performing the join operations using the join index.

Valduriez proposes a technique to perform join operations using a join index in his article. The described method for performing the join operation requires a large amount of main memory (see Valduriez article, page 223). The four steps of the Valduriez method for performing the join operation using a join index on two input tables designated A and B stored in a database are: (1) read in a portion of the join index (previously constructed) and selected matches between the join index entries and the records in A which will fit into available main memory; (2) internally sort the records from A and the join index entries by their table B identifiers; (3) select matches between the join index entries and the records in B outputting the resulting record; and (4) read in the next portion of the join index and the selected records of A. Repeat steps 2, 3 and 4 until all index entries in the join index are processed.

The Valduriez method has significant drawbacks when the input tables are large and the processor uses a relatively small main memory. The primary disadvantage is that there is a large amount of repetitious Input/Output ("I/O") cycles which must be performed during the join operation. Blocks of records in input Table B are often accessed numerous times when records located in the same disk block are indicated throughout the join index for Table B. The access repetition is caused by only processing a portion of the join index at one time. The Valduriez method is also only described for a maximum of two input tables being joined at one time.

An important consideration in measuring the efficiency of a join operation is the number and kind of disk accesses performed during that operation. The "cost" (processing time) of I/O operations becomes increasingly important when the tables to be joined are very large. A typical access of one block (typically 8000 bytes) of data stored on a disk using a conventional Fujitsu M2266 one gigabyte drive is about two milliseconds. The cost of rotational latency (moving the disk in a circular motion to the specified address) for that drive is about eight milliseconds. The seek time (moving the disk head up and down to the proper location on the disk) is about 9.5 milliseconds. Other drives have proportionate access times. While these costs are seemingly small when joining tables small in size, the costs increase drastically when the input tables are very large on the order described above. It then becomes increasingly important to minimize overall I/O operations to reduce the number of overall seek/rotational latencies caused by I/O operations and correspondingly reduce the operational cost ratio of seek/rotational latencies per block of data transferred.

As computer hardware technology advances, it is becoming easier to gain access to computer platforms which can parallel process multiple operations at one time. A computer platform can have multiprocessors in the same computer or can connect multiple processors through a conventional network. One of the objects of the invention is to take advantage of parallel processing opportunities to perform a more efficient join operation.

SUMMARY OF THE INVENTION

In accordance with the present invention there is provided a method and system for performing a join operation in a database system combining multiple tables comprised of individual records using a join index. The join operation uses a parallel-merge technique as part of the overall method. The method and system of the present invention performs most efficiently when the input tables are large and the main memory used by the processor is small relative to the size of the input tables. Two embodiments of the technique for joining tables using a join index requires reading each input table only once and writing the output data to an output file or files only once. An alternate embodiment requires additional input/output operations in order to process each input table completely independently providing the advantages of parallel processing. The technique only reads data blocks containing selected records from the input tables which will be part of the join result. Minimizing the number of I/O operations by reducing the number of necessary read and write operations is very important for the efficiency of a join operation when the input tables are very large because I/O operations are very time consuming.

The method of the present invention has three embodiments, all using the parallel-merge technique which sorts multiple files efficiently by identifying the lowest value in all the files. The first embodiment is named "slam-join" and is applicable to joining two input tables efficiently while using the parallel-merge technique. The second embodiment is named "parallel-join" and applies the parallel-merge technique to joining three or more input tables at one time. The third embodiment is named "multi-slam-join" which is applicable to joining three or more input tables at one time and combines the benefits of slam-join with the "jive-join" technique described in the parent application.

The slam-join method includes the following steps: First, a pre-existing join index and records specified in the join index from the first table are read until available main memory is full. The records are sorted by their corresponding second table join index entries and stored in first output files. The join index entries are also stored in temporary files. The next set of first table records and join index entries are read and processed until the entire selected first table is done. Buffers are then allocated for each temporary file and the join index entries in all the temporary files are parallel-merged. The identified records from the second input table are sequentially read and placed in the appropriate buffers. The records from each buffer are then written to an output file and joined together in the same order as the first output files to ensure that the records from each table will achieve the proper join result specified in the join index. Each table at the end of the join operation has a separate file or collection of associated files for its associated output which helps minimize the number of I/O processes by allowing the processor with a small main memory to completely process each input table only once.

The parallel-join embodiment processes each input table completely independently using the parallel-merge technique. Each input table is partitioned into temporary files of data which fit into available main memory based on the join index entries. The files are then sorted and parallel-merged to read in sequentially the records for the given input table. The records are then written to output files in the original order of the temporary files to ensure that the records from each table will achieve the proper join result specified in the join index.

The multi-slam-join embodiment uses the elements of the jive-join technique described in the parent application and applies an adaptation of the slam-join method to the first and last input tables while processing the intermediate input tables using an adaptation of the jive-join technique. The result is an improvement on the jive-join technique by reducing the number of allocation steps.

If a join index is not pre-existing for a group of tables to be joined, an index can be created by using a number of different methods. One way is called the nested-loop method which checks for a possible join result between each record of every table against the records in all the other tables. After a join index is created, the parallel-merge based techniques can be used.

The slam-join, multi-slam-join and parallel-join methods work for relational databases, object-oriented databases, and other types of database which support some type of record indexing system.

One system platform which supports the implementation of the parallel-merge based methods includes a computer system with a central processing unit, limited main memory (RAM), a mass storage medium which contains input tables of large amounts of data and space to store the results of the join operation, and connectors to transfer data between the central processing unit and the mass storage medium.

BRIEF DESCRIPTION OF THE DRAWINGS

Further objects, features and advantages of the invention will become apparent from the following detailed description taken in conjunction with the accompanying drawings showing a preferred embodiment of the invention, in which:

FIG. 3 is a graphical representation of two input tables and a join index;

FIGS. 5A–5E are graphical representations of the intermediate files created during the parallel-merge portion of the slam-join method when joining the two tables in FIG. 3.

FIG. 5F is a graphical representation of the join result of the two tables in FIG. 3 using the join index in FIG. 3;

FIG. 7 is a graphical representation of three input tables and a join index;

FIGS. 11A, 11B and 11C are graphical representations of part of the intermediate and output files created during the multi-slam-join method when joining the three tables in FIG. 7;

FIG. 11D is a graphical representation of the join result of the three tables in FIG. 7;

FIG. 12A is a graphical representation of two tables upon which a join index has not yet been created;

FIG. 15 is a graphical representation of the operation of a hybrid join index which can be used in conjunction with the slam-join technique.

DETAILED DESCRIPTION OF PREFERRED EMBODIMENTS

The present invention is a join technique in a database system using a join index which will efficiently process large input tables in a join operation to produce a desired join result when the processor used for the operation uses a relatively small main memory. The technique minimizes necessary I/O operations and maximizes the use of the available main memory. Three embodiments of the technique are described herein, all of which use a parallel-merge operation which is described in detail in FIG. 2. For convenience, the first embodiment of the technique will be called "slam-join." Slam-join is used for combining two tables during a single join operation. The second embodiment will be called "parallel-join" and is used for combining three or more tables with a single join operation. While parallel-join can be used to join two tables, it is not as efficient as slam-join when joining two tables. The third embodiment will be called "multi-slam-join" and is an adaptation of slam-join which can be used to join three or more tables at one time. Multi-slam-join also uses elements from the "jive-join" technique, a technique described in the parent application. Each embodiment will be described in detail in later sections.

Figure 1:
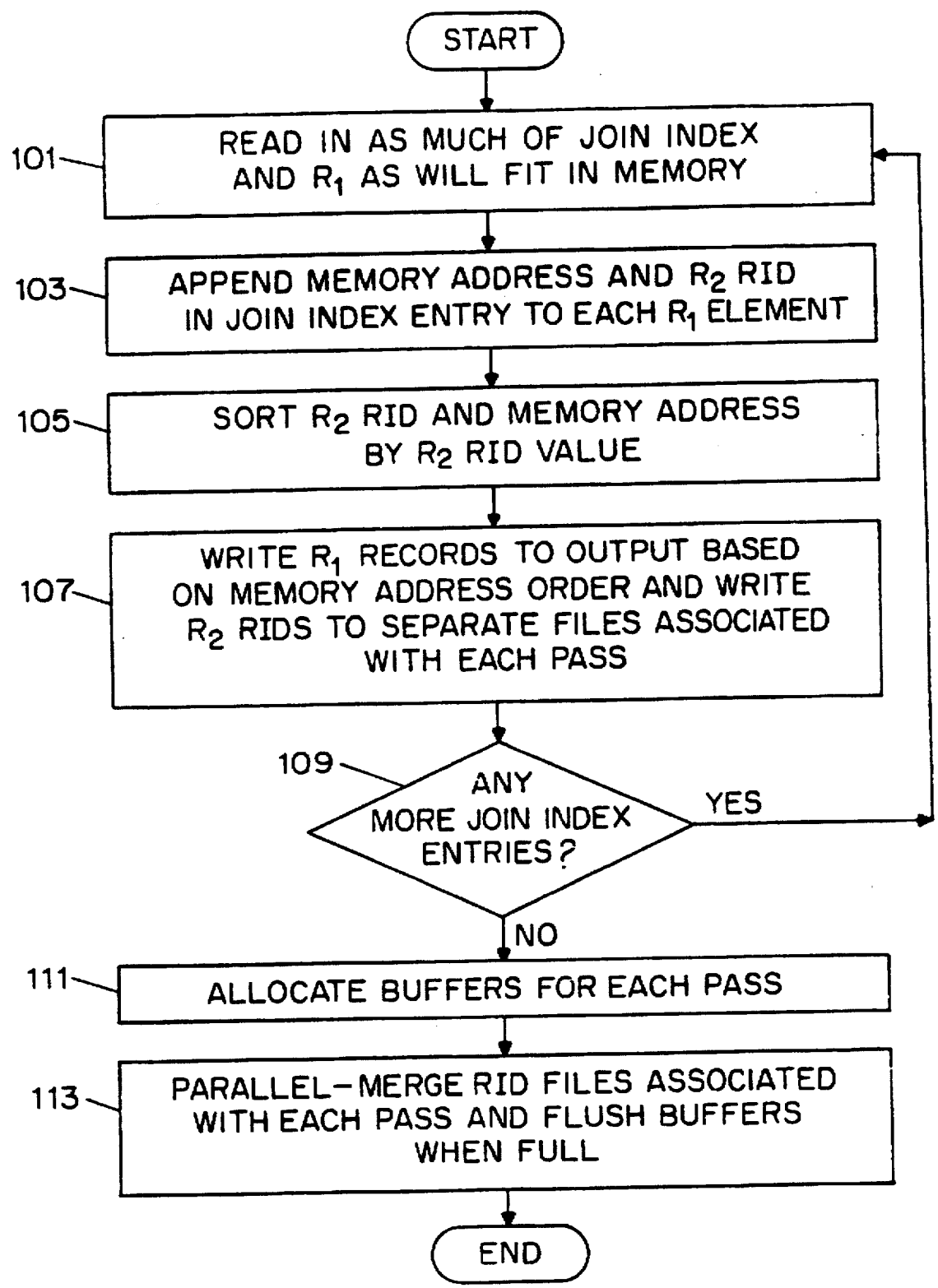
FIG. 1 is a flow chart of the slam-join method in accordance with the invention.

FIG. 1 is a flow chart showing the steps performed in the slam-join technique for joining two tables of data. The technique is preferably performed in a main memory which is relatively smaller than a secondary memory or memories containing the two input tables in order to maximize its advantages over other techniques. As a result of the size of main memory, the records to be joined from the input tables cannot be read into available main memory all at one time for processing. Available main memory is that portion of memory, usually random access memory (RAM), which is not allocated to another specific function.

Step 101 reads into available main memory a portion of the join index and a portion of records from the first input table (designated $R_1$ in this description) identified in the join index portion which was just read. The portion of records and join index entries read into available main memory will be as much as will fit into the memory. The size of the records from $R_1$ identified in the join index could be two, three, fifty or even one thousand or more times the size of available main memory. The number of actual records read into available main memory at one time will depend on the size of each record and the size of available main memory and the data distribution in the join index. Data will be read in disk blocks which typically include many records.

Each time the records and the corresponding portion of the join index fills up available main memory when read, the portion read will be called a "pass" for purposes of this description. Thus, if available main memory is filled three times to read in all the selected $R_1$ records, three passes will have been required. The corresponding second input table (designated $R_2$ in this description) record identifiers ("RIDs") will be read into available main memory as part of the join index. The second input table RIDs in the join index indicate which $R_2$ record is to be matched with the indicated $R_1$ record.

Step 103 then appends the associated memory addresses of the $R_1$ records stored in available main memory to the corresponding $R_2$ RIDs in the join index entries also stored in available main memory. The use of memory addresses will increase processing speed when the $R_1$ records are sorted by their associated $R_2$ join index RIDs in a future step. The addresses themselves will be sorted with the $R_2$ RIDs instead of the actual records. It is faster to sort the addresses rather than the records because the records are much larger in size than the addresses.

Step 105 sorts the $R_2$ join index RIDs in ascending order and correspondingly places the appended $R_1$ record memory addresses in the $R_2$ RID order. Alternatively, the $R_1$ records themselves could be physically sorted and moved instead of only their addresses although that approach would require more processing time and would therefore be less desirable most of the time.

Step 107 then writes the $R_1$ records in the order of the sorted memory addresses to a separate $R_1$ output file designated for each pass. Step 107 is accomplished by writing the contents of each sorted memory address location which are the corresponding $R_1$ records. The sorted $R_2$ identifiers are also written to a separate temporary file associated with each $R_1$ output file which will be used later in the technique. The temporary file containing the $R_2$ identifiers may be stored in part of main memory or may be stored in a file located outside of main memory.

Step 109 checks if there is any portion of the join index (and thus $R_1$ records) which has not yet been read. If there is a remaining portion, the technique jumps back to step 101. Steps 101–107 will be then repeated as necessary to read in the entire join index and the identified $R_1$ records.

If all the join index identifiers have been processed, then the portion of the technique with respect to $R_1$ is complete and the process continues with step 111. The $R_1$ output files are logically linked together by pointers from the end of one file to the beginning of another. Alternate ways of linking files can also be used such as a conventional location table identifying the start of each output file. By storing the results of the join operation for the $R_1$ records separately from the results of the other input tables' records, the results will be vertically partitioned.

Figure 5A:
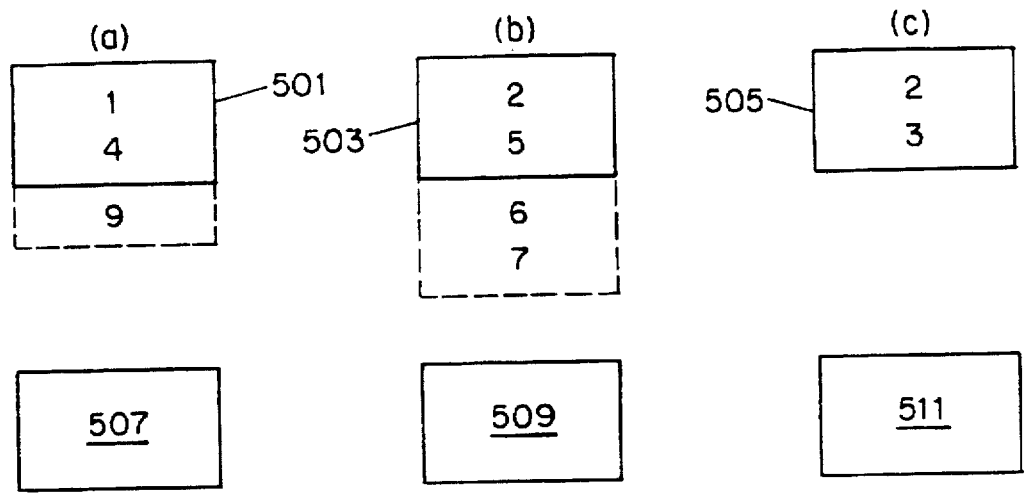

Step 111 clears available main memory and allocates a number of buffers in the available main memory equal to the number of passes required for reading in the full join index and corresponding $R_1$ records. For example, if four passes of reading portions of the join index and $R_1$ records were required, then four buffers would be allocated. Each buffer will eventually contain the $R_2$ records which correspond to the $R_2$ RIDs index stored in the temporary files for each pass performed. Each buffer will contain a separate merge file which consists of a portion of the $R_2$ RIDs of an associated temporary file. These merge files will be illustrated in FIG. 5A. $R_2$ RIDs indicate the location of the $R_2$ records which correspond to the previously stored $R_1$ records. A graphical example shown in FIG. 5A shows the buffer structure and explain in detail its operation.

Step 113 performs a parallel-merge operation on the $R_2$ RIDs stored in the merge files. First, the merge files are filled with as much of the $R_2$ RIDs from the corresponding temporary files as will fit into available main memory when the identified records in the merge files are read. The size of the merge files is an easy calculation once the size of the records, number of passes and size of available main memory is known. The $R_2$ RIDs are then merged such that the lowest value RID is identified and the corresponding $R_2$ record is read from the second input table and placed in the corresponding buffer associated with the $R_2$ RID just selected. After a record is read from the second input table, the identifier in the merge file is removed and the next identifier from the merge file becomes the lowest in the individual merge file (the $R_2$ RIDs have been previously sorted). The technique again identifies the lowest identifier between the current merge files so that the records from $R_2$ can be read in a sequential order. When empty, the merge files will be filled again from the temporary files of any RID which has not yet been processed. The parallel-merge technique in step 113 is explained in further detail in FIG. 2. The parallel-merge technique is also shown in an example in FIGS. 5A–5E.

All the $R_2$ records are processed sequentially in this manner. The $R_2$ records do not need to be read immediately after the identifier is selected, rather a secondary buffer or buffers can be used to store a portion of $R_2$ records, only some of which will be read. The individual records can then be accessed from the secondary buffer. The buffer can be located in the processing computer or can be an external buffer. Alternatively, a secondary buffer storing locations of $R_2$ records to be read can be used instead of immediate disk access until a sufficient number are present to efficiently access the $R_2$ data storage medium. This allows the technique to save I/O operations by sequentially reading the $R_2$ records and ensuring that disk blocks do not need to be read twice and that the disk storing the input table is not randomly accessed.

Figure 2:
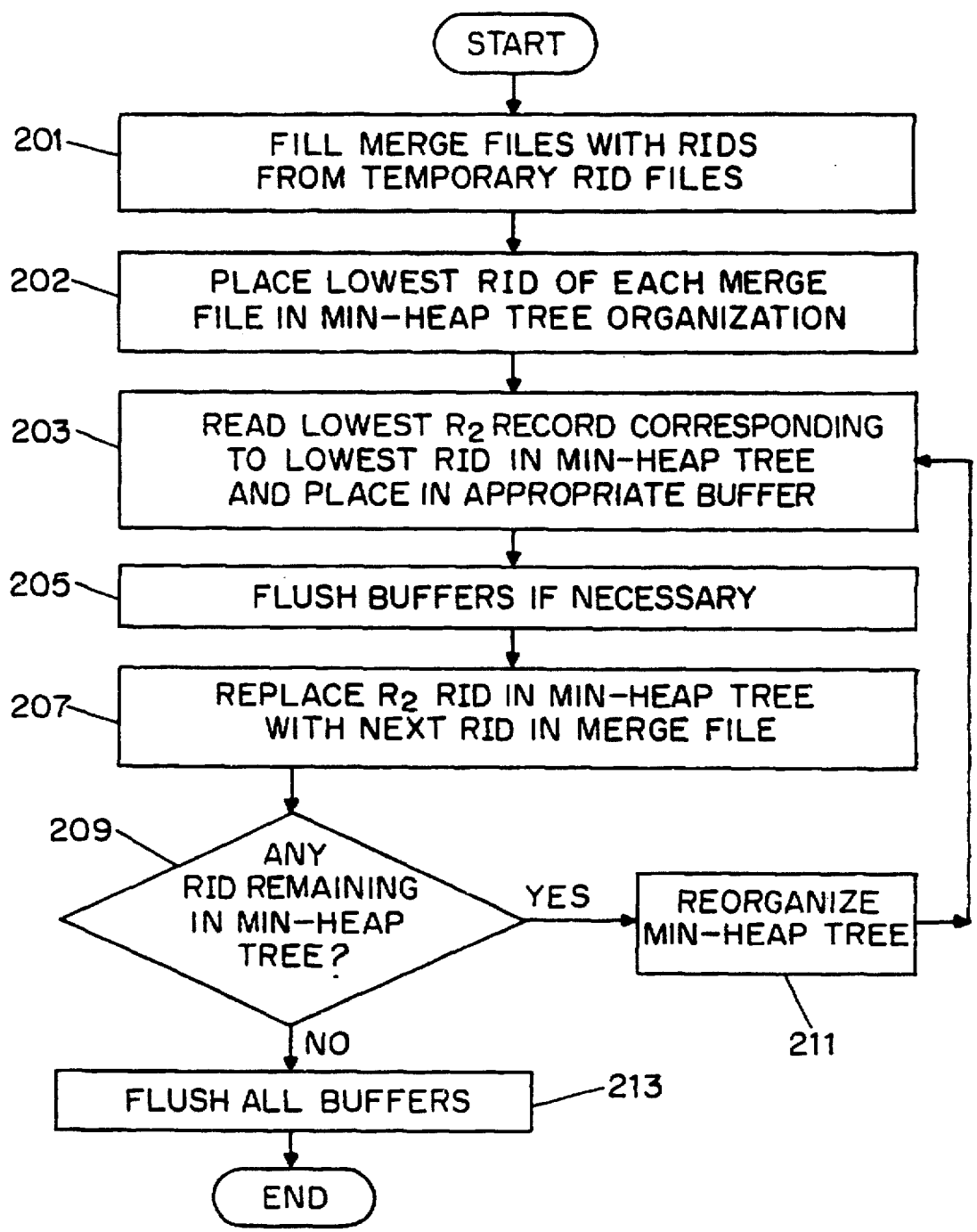
FIG. 2 is an expanded flow chart of the parallel-merge step of FIG. 1.

FIG. 2 is a flow chart of the preferred technique for performing a parallel-merge operation on multiple temporary files formed during the slam-join technique shown in step 113 of FIG. 1. The parallel-merge technique described is also used in the other embodiments of the invention described herein. The parallel-merge operation can be performed in other ways and the invention is not limited to the use of the technique described in FIG. 2. The parallel-merge process starts with at least two merge files containing $R_2$ RIDs. The merge files contain the RIDs from corresponding temporary files which are already in ascending sorted order from a prior step. The merge files will be merged in parallel such that the lowest identifier from all the merge files in memory will be selected in order to read the first record located in the second input table being joined. The merge files are preferably located in an in-memory buffer. The merging operation ensures that the access of the second input table will be performed sequentially from the lowest $R_2$ identifier in all the merge files to the highest $R_2$ identifier.

Figure 5B:
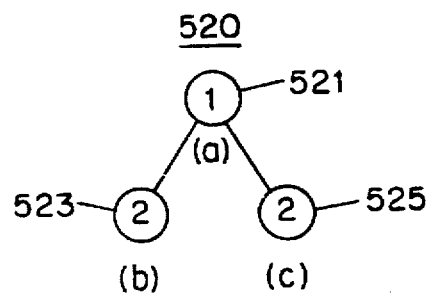

The parallel-merge operation in the present invention uses a conventional min-heap technique for determining the lowest $R_2$ identifier. Each of the merge files reflect the prior sorting in the temporary files, so that the RIDs will be in ascending order from the lowest value to the highest value. The lowest $R_2$ identifier for each merge file is placed in a min-heap data structure which organizes the identifiers in a logical tree type fashion with the lowest identifier becoming the root (an example of the min-heap tree is shown in FIGS. 5B). When the lowest identifier is used to read a $R_2$ record into available main memory, it is removed from the merge file. When a merge file becomes empty it is replaced with another RID from the associated temporary file if any identifiers remain in that temporary file. The $R_2$ records when read are placed in buffers corresponding to each merge file. When a buffer exceeds a maximum pre-defined capacity, it is "flushed" or written to a file on an outside disk. The flushing process is necessary because of the relatively small size of available main memory. The min-heap tree is then reorganized so that the lowest identifier (of the current merge files) in the tree becomes the root. The min-heap structure allows for a quick determination of the lowest identifier and can quickly adapt and sort again when RIDs in the tree are replaced with new ones.

The steps of the parallel-merge technique with reference to FIG. 2 will now be described. Step 201 in the parallel-merge technique fills each merge file with the $R_2$ RIDs located in the associated temporary files and corresponding to a particular allocated buffer. Thus the $R_1$ records read and processed in the first pass will have an assigned buffer, assigned merge file, and assigned temporary files which contains the sorted $R_2$ identifiers from the join index corresponding to the read $R_1$ records. The merge file can hold more RIDs than allocated $R_2$ records because of their smaller memory requirements. Thus if each buffer is able to contain three records at one time, the corresponding merge file will hold at least three RIDs. The capacity of each buffer is dependent on the size of available main memory and the size of the records. If a buffer capacity of holding $R_2$ records is exceeded, the contents of the buffer are "flushed" or written to a file on an outside disk. Each merge file is filled to its capacity with the contents of corresponding temporary files at the beginning of the parallel-merge operation. Additional RIDs from a temporary file not yet processed will be added to the merge file after the initial RIDs in the merge file have been processed.

Step 202 places the lowest RID in each merge file into a min-heap organization. The identifiers do not need to be physically moved in memory but a pointer could be created to point to each of the lowest RID values. The min-heap organization is akin to a logic tree structure. Examples of these structures can be seen in FIGS. 5B–5E which describe an example of a join operation of two input tables.

Step 203 reads the lowest $R_2$ record identified by the lowest $R_2$ RID in the min-heap structure (the base of the tree) and stores it in the corresponding predefined buffer. The buffer which receives the $R_2$ record will be the buffer corresponding to the merge file which was selected as containing the lowest RID.

Step 205 flushes the buffer to which a record has just been written to outside files if necessary. The "flush" process will occur if the buffer is full and cannot hold any more $R_2$ records. If the buffer is not full or the flush is complete, then the process continues.

Step 207 then transfers the next lowest RID from the merge file from which the $R_2$ record was just read to the node in the min-heap organization which was just identified as the lowest RID processed. If the merge file is then empty it is filled again with the RIDs from its associated temporary file. The temporary file is already in sorted order from previous steps in FIG. 1 so the lowest RID can be readily accessed. If there are no more RIDs which have not yet been processed in the temporary file of the record just read, then no new RIDs will be placed in the merge file. If there are no RIDs remaining in a merge file, then the buffer and corresponding merge file can be unallocated in available main memory and that memory space reallocated to expand the remaining buffers. This will allow more RIDs to be processed at one time for a given buffer and merge file because of the additional memory space.

Step 209 checks if at least one RID remains in any of the identifier merge files. If at least one RID remains, the process continues with step 211. If no RIDs remain in any merge file, the parallel-merge process is near completion and continues with step 213.

Step 211 reorganizes the min-heap structure which contains the lowest RID from each of the remaining merge files. The lowest RID in the heap now becomes the base of the tree which identifies it as the low RID. The actual technique of reorganization of a min-heap is well known in the art. The process then jumps to step 203.

Step 213 flushes all the buffers if any records remain in any of the buffers and writes the records to an output file which corresponds to the buffer. Some of the buffers may not be completely full at the end of the parallel-merge operation, so they will not be automatically flushed in step 205, and require flushing at this point in the technique. The output files which all correspond to a particular buffer are then logically joined by pointers from the end of the one output file to the beginning of another. Alternatively, the memory address of the beginning of each output files could be stored in a location table.

Figure 4A:
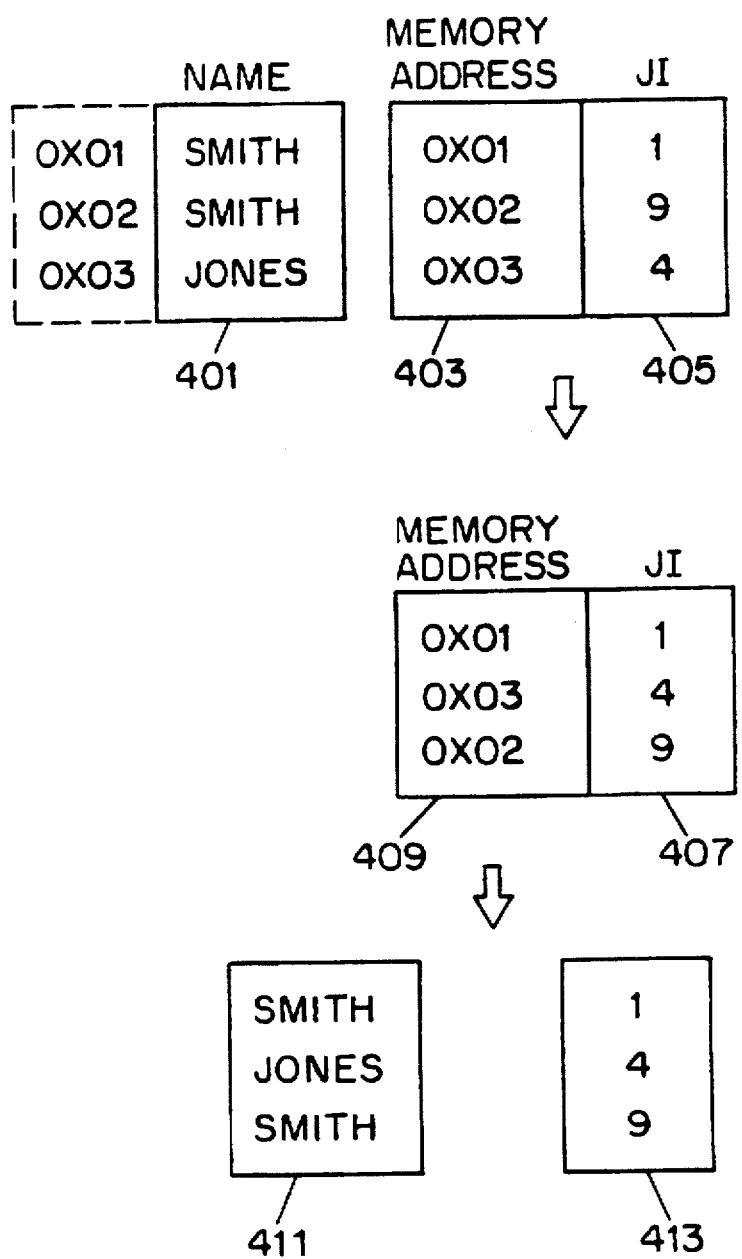
FIG. 4A is a graphical representation of part of the intermediate and output files created during the slam-join method when joining the two tables in FIG. 3.
Figure 4B:
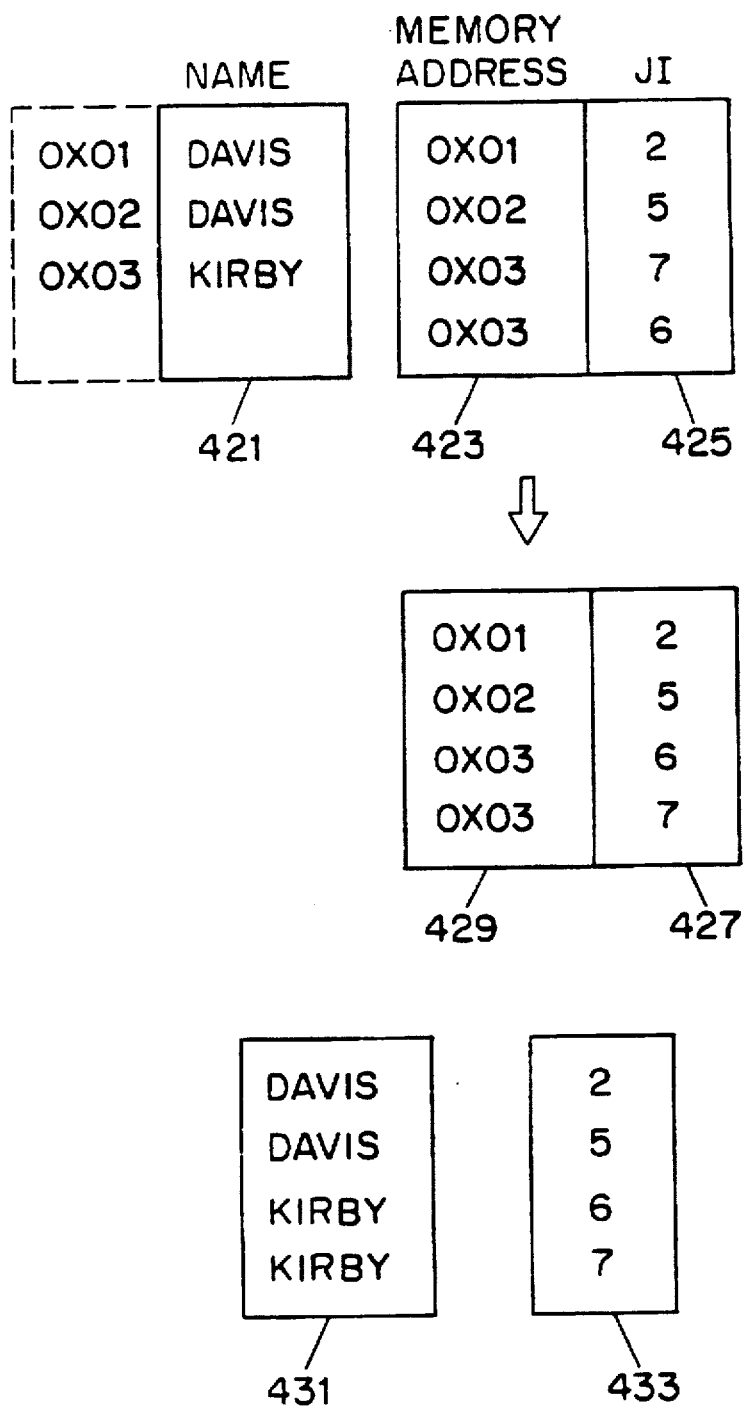
FIGS. 4B and 4C are further graphical representations of part of the intermediate and output files created during the slam-join method when joining the two tables in FIG. 3.
Figure 4C:
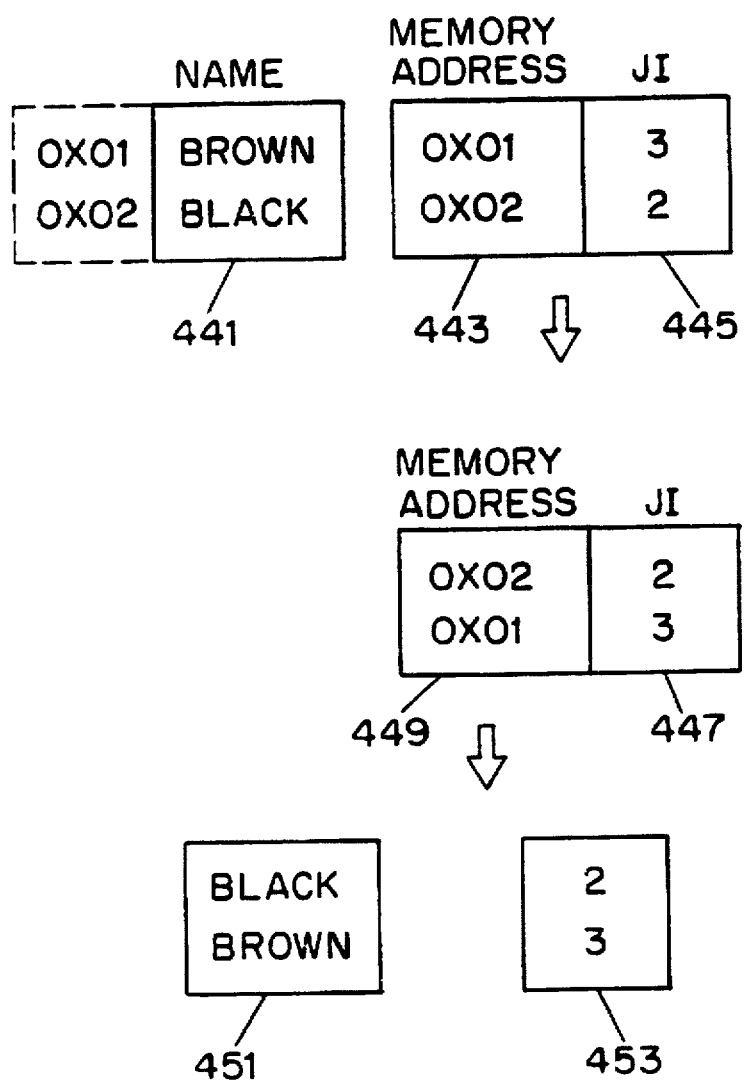

FIGS. 4A–4C are graphic depictions of an example where the slam-join technique is applied to perform a join operation on two tables in a database system. The data is organized into tables of related data. The example is only illustrative and is not meant to limit the scope of the invention. A join operation using three tables will be described in a later example.

FIG. 3 shows a first input data table 301 which includes columns of data entitled Student name 301A and their Course number 301B. Also included with table 301 is a column of sequential record identifiers 301C which shows the order of the records in this example. A set of numbers 301C does not in practice appear with the table 301, but are present only for this explanation. Table 305 is a table to be joined with table 301 and includes columns of data entitled Course number 305A and its Instructor 305B. Also included for this explanation is a column of sequential record identifiers 305C which shows the order of the records in this example. The data contained in the two tables are to be joined together producing a join result only of records of each table which fulfill a desired join condition. For this example, only records from first table 301 which have the same course number as records in second table 305 will be in the join result. Additionally, all columns in first table 301 and second table 305 will be present in the join result so that the join result will have a student column, a course column and an instructor column. It is also possible to select only some of the columns from the input tables to become part of the join result. While each input table contains only nine records, this number is for the ease of this example only. When this example is extrapolated out to actual size contemplated for use, it is expected that thousands, millions, or even billions of records would be processed.

The join index 303 shows pairs of related records which will be present in the join result. The join index is considered to be pre-existing for use with the slam-join technique, although a join index can be created if needed and is discussed below (See discussion of FIGS. 12A–12C). In this example, the join index is ordered by the $R_1$ RID value. The join index contains a first column 303A of the record identifiers of the first table 301 records to be joined, a second column 303B of the record identifiers of the second table 305 records to be joined, and a third column 303C included only for this explanation, which is a column of sequential record identifiers 305C to show the order of the records. Each entry in each record in the join index is called a record identifier. Column 303B is thus made of second table 305's RIDs values. In this example, the join index represents matches of the course number of the student from table 301 with the course number of the instructor in table 305. In this example we assume that one record occupies one disk block. In practice, it is typically the case that many records fit in each disk block.

FIGS. 4A–4C show some of the intermediate and output results of the slam-join technique applied to the input tables in FIG. 3. This example is shown to help explain the operation of the slam-join technique. The intermediate results are the product of applying the slam-join technique set out in FIG. 1 to the input tables and join index in FIG. 3. As shown in the flow chart of the slam-join technique FIG. 1, first a portion of the join index and identified $R_1$ records are read into the available main memory. As many records and record identifiers from the join index as will fit into available main memory will be read in one pass. Portions of the main memory may be reserved for sorting techniques, storing temporary files or file manipulation and are not considered part of available main memory. In this example of FIG. 4A–4C, available main memory is capable of holding three full records at one time. Additionally, all the records are the same size. The records could be varied in size in actual practice depending on the type of data and number of columns. The size of the record identifiers are not significant in this example because they are much smaller than the records themselves.

In this example, the first three records of the first input table $R_1$ identified in the join index are read from an outside storage disk and stored in column 401 of FIG. 4A in available main memory. The corresponding $R_2$ identifiers to the $R_1$ records related in the join index are also stored in available main memory in column 405 (step 101 of FIG. 1). The storage location of the two columns can be at different places in memory as long as a pointer or location table tracks the beginning of each column. The physical memory addresses of the $R_1$ records are then appended to the corresponding $R_2$ identifiers and are shown in column 403 (step 103 of FIG. 1). The memory addresses are the actual addresses where each $R_1$ record is stored. Logical memory addresses could also be used depending on the system platform organization. Although shown in a table format in this example, the data can be stored in any conventional manner as long as the location of the beginning of each column is stored or has a pointer associated with it. The memory addresses in column 403 are shown as "0x01", "0x02", and "0x03" and could be any addressable memory location in available main memory.

Step 105 in FIG. 1 when applied to this example sorts the $R_2$ RIDs in ascending order while also reordering the memory $R_1$ addresses in the sorted order of the $R_2$ RIDs. Column 407 of FIG. 4A shows the $R_2$ RIDs in sorted order and column 409 shows the memory addresses in the sorted order of the $R_2$ RIDs. Thus the third RID in column 407 is now "9" and the third address in column 409 is "0x02".

Step 107 in FIG. 1 when applied to this example writes the $R_1$ records to an output file 411 of FIG. 4A based on the sorted $R_2$ RID order. This is most efficiently accomplished by simply writing the $R_1$ records to output file 411 sequentially in the order of the sorted memory addresses in column 407. When this is done, the output file 411 is created containing $R_1$ records in the order of the sorted $R_2$ RIDs. The $R_2$ RIDs are also written to a temporary file 413 for later processing.

FIG. 4B shows more intermediate and output files which are generated during the operation of the slam-join technique in this example. After the initial pass in FIG. 4A is processed, additional $R_1$ records not yet processed are read into available main memory (after checking for additional records in step 119 of FIG. 1). Again, as many records and record identifiers as will fit into available main memory will be read in each pass. For this second pass, three more $R_1$ records and their corresponding record identifiers are read and stored in available main memory. The next three records identified in the join index are read from $R_1$ and stored in column 421 in available main memory. The corresponding $R_2$ identifiers from the join index are also stored in available main memory in column 425. $R_1$ record #6 ("Kirby") has two $R_2$ RID join index entries and the record will be joined in the final join results with two records from $R_2$. All of the $R_2$ RIDs associated with each $R_1$ record are included in the $R_2$ identifier column 425. The $R_1$ record with multiple $R_2$ RIDs need only be read once from its outside storage location. The memory addresses of the $R_1$ records are then appended to the corresponding $R_2$ RIDs and are shown in column 429. The addresses can be different addresses for those in column 403 of FIG. 4A or can be the same addresses used again because the initial processing of memory addresses for the first pass in FIG. 4A is complete. The memory address for the $R_1$ record "Kirby" is appended twice to both the $R_2$ RID "7" and the $R_2$ RID "6". That record located at the memory address "0x03" will be written twice to the output file 431 in the appropriate order after the $R_2$ RIDs (and addresses) are sorted.

Step 105 in FIG. 1 when applied to this example sorts the $R_2$ RIDs in ascending order while also reordering the memory $R_1$ addresses in the sorted order of the $R_2$ RIDs. Column 427 shows the $R_2$ RIDs in sorted order and column 429 shows the memory addresses in the sorted order of the $R_2$ RIDs. Thus the third RID in column 427 is now "6" and the third address in column 429 is "0x03".

Step 107 in FIG. 1 when applied to this example writes the $R_1$ records to an output file 431 based on the sorted $R_2$ RID order. This is efficiently accomplished by simply writing the $R_1$ records in the order of the sorted memory addresses in column 427. When this is done, the output file 431 is created containing $R_1$ records in the order of the sorted $R_2$ RIDs. The $R_2$ RIDs are also written to a temporary file 433 for later processing.

FIG. 4C shows the intermediate and output files for the final pass of the first input table 301. The final two $R_1$ records identified in the join index and their associated $R_2$ RIDs are read and stored in available main memory. The last two $R_1$ records identified in the join index are read from the first input table and placed in column 441 stored in available main memory. The corresponding $R_2$ identifiers from the join index for each $R_1$ record are also stored in available main memory in column 445. The memory addresses of the $R_1$ records are then appended to the corresponding $R_2$ identifier and are shown in column 445 of FIG. 4C.

Step 105 in FIG. 1 at this point in the example sorts the $R_2$ RIDs associated with the last two records in ascending order while also reordering the memory $R_1$ addresses in the sorted order of the $R_2$ RIDs. Column 447 shows the $R_2$ RIDs in sorted order and column 449 shows the memory addresses in the sorted order of the $R_2$ RIDs. Thus the second RID in column 447 is now "3" and the second address in column 449 is "0x01".

Step 107 in FIG. 1 at the point in the example writes the $R_1$ records to an output file 451 based on the sorted $R_2$ RID order. This is most efficiently accomplished by simply writing the $R_1$ records to output file 451 sequentially in the order of the sorted memory addresses in column 447. When this is done, the output file 451 contains $R_1$ records in the order of the sorted $R_2$ RIDs. The $R_2$ RIDs are also written to a temporary file 453 for later processing.

The first phase of processing in the slam-join technique corresponding to steps 101–109 in FIG. 1 is now complete because all RIDs in the join index have been processed. The $R_1$ records have been written to output files 411, 431 and 451 which can be logically connected by pointers or a location table to form the equivalent of one output file. The output file is vertically partitioned because the $R_1$ records are processed and stored separately from the $R_2$ records.

FIG. 5A–5F show the intermediate results of the second phase of the slam-join technique. After all the records from $R_1$ are read, processed, and stored in output files, the second phase of reading and processing the $R_2$ records is performed. First, a buffer is created for each pass performed in the first stage along with an associated merge file for each buffer (step 111 of FIG. 1). In this example, three passes were required to read in all of the $R_1$ records, therefore three buffers will be created. Referring to FIG. 5A, buffer 507 corresponds to the $R_1$ records and $R_2$ RIDs read in the first pass (first pass shown in FIG. 4A) buffer 509 corresponds to the second pass (second pass shown in FIG. 4B) and buffer 511 corresponds to the third and last pass (third pass shown in FIG. 4C). Merge file 501 (designated by "(a)") is associated with buffer 507 (and thus the first pass); Merge file 503 (designated by "(b)") is associated with buffer 509 (and thus the second pass); and merge file 505 (designated by "(c)") is associated with buffer 511 (and thus the last pass).

In this example, each buffer can hold only one record at a time so that when all three buffers are full, three records will be stored in available main memory at one time which is the memory designated maximum capacity in this example. The presorted temporary files containing the $R_2$ RIDs are located in an outside memory (not in available main memory) are then loaded into the merge files corresponding to each temporary file. In this example, each temporary merge file will hold two RIDs at one time. The number of RIDs in a merge file depends on the amount of available main memory. For this explanation, each merge file will hold two RIDs. Each merge file is loaded with the lowest RID numbers from the corresponding temporary file (already in sorted order) so that merge file 501 will contain RID values "1" and "4"; merge file 503 will contain RID values "2" and "5"; and merge file 505 contains RID values "2" and "3" after the initial loading. This loading step corresponds to step 201 in FIG. 2. The remaining RIDs for each merge file are shown outlined in a broken line in FIG. 5A. The empty buffers and filled merge files at this point are shown in FIG. 5A.

FIG. 5B shows the initial min-heap structure used for identifying the lowest RID value from each of the merge files during the parallel-merge operation (step 113 of FIG. 1). The min-heap structure is in the form of a tree 520 which has as its root the lowest value RID from the merge files. If any node containing a value in the tree is replaced, the tree will be reorganized and the lowest value will become the root of the tree by a technique well known in the art. In tree 520, node 521 corresponds to the lowest RID value for merge file 501; node 523 corresponds to the lowest RID value for merge file 503; and node 525 corresponds to the lowest RID value for merge file 505. Each node has a pointer or stored value which identifies which merge file the RID value came from. This allows the min-heap technique to identify the buffer in which to place the $R_2$ record corresponding to the lowest RID value in the min-heap tree when the record is read into available main memory. Placing the RID values in the min-heap structure corresponds to step 202 in FIG. 2.

Figure 5C:
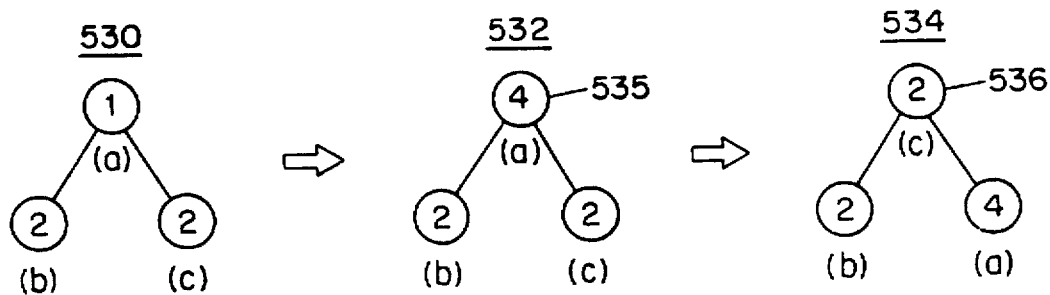

FIG. 5C shows the min-heap structure transition when one $R_2$ record is read which has the lowest RID value remaining. Tree 530 shows the initial tree structure generated at the beginning of the phase (same as FIG. 5B). Tree 532 then replaces the minimum RID value whose identified $R_2$ record was just read with the next RID from the corresponding merge file. In this case, the value of "1" in node 535 was replaced with the RID value of "4" from merge file 501. The RID value of "4" was the next minimum value in merge file 501. Now the min-heap tree must be reconfigured to identify the minimum value of all the current nodes. The tree is reconfigured to look like tree 534 using a technique well known in the art. The min-heap tree 534 now contains the lowest remaining RID values for each of the merge files 501, 503 and 505. The root of the min-heap tree, node 536, is the lowest RID value. The process of reading the $R_2$ record corresponding to the identified lowest remaining RID value is repeated until all the $R_2$ records identified in the join index (and thus in the temporary files and the merge files) are read from the outside storage medium and written to a proper output file.

When the minimum $R_2$ RID is identified in the min-heap tree structure, the corresponding $R_2$ data can be read immediately from its outside storage medium. However, it is more efficient to store the location of the read requests until a sufficient number of requests are stored and blocks of data can be read together in sequence which saves I/O operations and improves efficiency. Alternatively, a portion of the $R_2$ records can be read as a block and stored in a buffer outside of available main memory which can be quickly accessed when a $R_2$ record is identified and required to be read.

If two of the nodes in the min-heap tree have the same $R_2$ RID value, an arbitrary one will become the root. The $R_2$ record read into main memory corresponding to the $R_2$ RID value will only be read in once for both nodes. The $R_2$ record will simply be copied to the appropriate buffers.

FIG. 5D shows a representation of the min-heap tree structure when one of the merge files becomes empty because all the RIDs for that merge file have been processed. Tree structure 540 represents an iteration in this example when the minimum RID values for each of the three merge files are "3", "4" and "5" as shown in the FIG. 5D. One of the $R_2$ RID values is the root in the tree structure indicating that it is the minimum $R_2$ RID value. In this example the RID value "3" from merge file 505 is the minimum value. At this stage, there are no other RIDs stored in merge file 505 or its associated temporary file after the RID with a value of "3" is processed. Therefore, all of the $R_2$ records to store in buffer 511 (corresponding to merge file 505) have been read and processed. After buffer 511 is flushed to an output file, there is no further need for buffer 511 and merge file 505. The memory space for these files can then be reallocated to the remaining buffers and merge files to increase the efficiency of the operation. The remaining min-heap tree structure 542 would now only have two nodes, one for each remaining merge files 501 and 503.

FIG. 5E shows a representation of the min-heap tree structure when a second merge file and associated temporary file is now empty. Tree structure 550 represents an iteration in this example when the minimum $R_2$ RID value for the remaining two merge files are "7" and "9". When the $R_2$ record corresponding to the $R_2$ identifier value of "7" is read from the outside storage medium, there are no remaining $R_2$ RID values in merge file 503 or its associated temporary file. Therefore, all the $R_2$ records that correspond to the merge file 503 and associated buffer 509 have been processed. The space in memory for buffer 509 and merge file 503 will then be reallocated to the remaining buffer 507 and merge file 501. This will allow for faster processing of any remaining records by allowing larger groups of records to be read in as sequential blocks. The remaining min-heap tree structure is shown as tree 552 and contains a single node corresponding to the remaining value in merge file 501.

After all the $R_2$ records identified in the join index have been read from an outside storage medium and processed, multiple output files (not shown) corresponding to the flushed buffers will have been created for the $R_2$ records. These files can be connected together by a pointer or location table and are vertically fragmented because they are processed and stored separately from the $R_1$ table. The $R_1$ output files correspond to the $R_2$ output files so that the nth record in the $R_1$ output files will correspond to the nth record in the $R_2$ output files. The vertical fragmentation allows a reduced number of I/O transfers by processing the records of each input table separately and only reading and writing the records from first table 301 and second table 305 once to and from outside files.

FIG. 5F shows a graphic representation of the connected output files for both $R_1$ and $R_2$. File 560 is made up of output files 411, 431 and 451 of the identified $R_1$ records. File group 562 is the connected output files for the identified $R_2$ records. The contents of each file correspond to the relationship expressed in the join index. While the exact order in the output files is not the same as in the join index, the join relationship is preserved. The output files could be sorted together if a different order is desired.

The slam-join technique can be extended to joining three or more tables simultaneously by using either one of two further embodiments, referred to as the parallel-join technique and the multi-slam-join technique. A comparison of the techniques is made in later sections.

Figure 6:
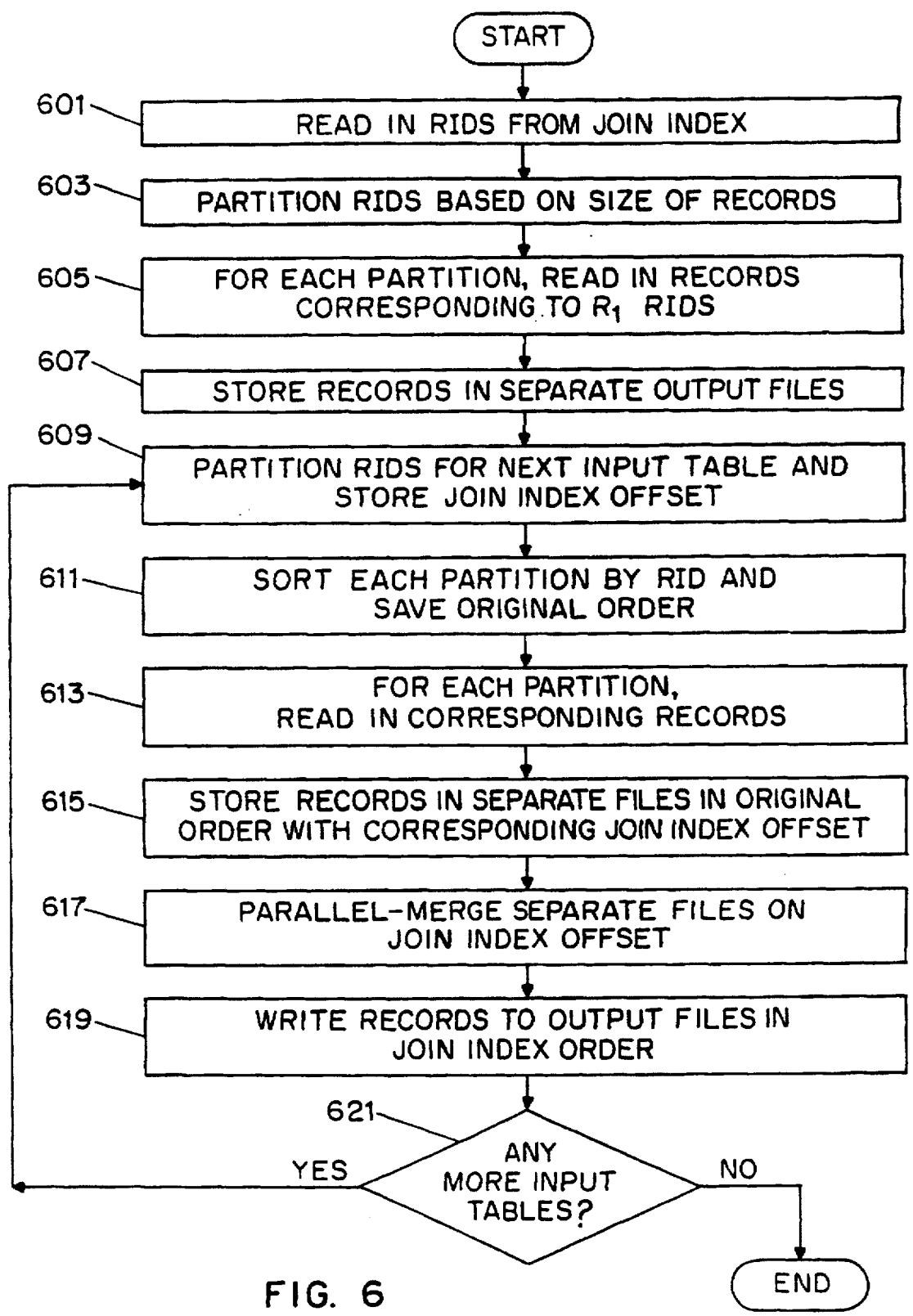
FIG. 6 is a flow chart of the parallel-join method in accordance with the invention.

FIG. 6 is a flow chart showing the steps performed in the parallel-join technique for joining three or more tables in one join operation. While the parallel-join technique can be used for joining only two tables, the slam-join technique is the preferred technique for that situation.

Step 601 reads into available main memory all the RIDs for the first input table $R_1$ from the join index. Step 603 then partitions the $R_1$ RIDs on the RID values into groups based on the number of independent processors available. The file in available main memory associated with each group is called a buffer. An example of a partitioning value is "RID<3". The $R_1$ records read in sequentially from the outside storage medium will be assigned to the appropriate buffer based on the value of its $R_1$ RID. The $R_1$ RIDs in the join index are assumed to be in numerical order at the start of the join operation. If they are not, a sort can be performed before the parallel-join operation is implemented to place them in that order. Alternatively, the $R_1$ table if not in order can be processed like all the other input tables in steps 609 to 621. Step 605 reads in the $R_1$ records for each buffer. The data is actually read in disk blocks which can contain multiple records. If one processor is used, the RID values will be read in ascending order starting with the lowest RID value. The buffers will be processed one at a time. If multiple processors are being used, each of the processors can access the $R_1$ input table simultaneously because each RID in each buffer start at a different memory location in the input table. In step 607, the results of each filled buffer are written to an output file. The buffers can be processed sequentially or in parallel depending upon the processor capability. Each output file can be connected by either a pointer or location table in order to create the equivalent of one output file for the $R_1$ records selected by the join index. At this point in the technique, the processing for the $R_1$ records is complete.

Step 609 starts processing the remaining input tables. The tables can be processed either in succession or at the same time, depending upon the processor availability. The flow chart shows each input table being processed on the same processor, but the flow chart could be easily adapted to accommodate multiple processors.

Steps 609 to 621 are performed for each additional input table not in sorted order. The first table operated on is $R_2$. Similar operations are performed on all other input tables (including the $R_1$ table if not in sequential order).

Step 609 partitions the RIDs from the join index for the next input table to be processed into buffers. The partitioning of available main memory will create buffers whose records will all fit into main memory at one time. The partitioning conditions will give an approximately equal number of records to be allocated to each buffer if all records are the same size. The corresponding join index offset is also saved in the buffer for later processing. Step 611 then sorts the contents of each buffer by the $R_2$ RID values in ascending order so that each input table can be read sequentially from the outside storage medium. The original order of the $R_2$ RID value is preserved in a temporary file also containing the join index offset preferably located in a file outside of main memory. Alternatively, the temporary file could be part of main memory. Step 613 then sequentially reads in each of the selected $R_2$ records for each partition in turn and places them in the memory buffer. The buffer is written to a temporary output file in the original order of the $R_2$ RIDs for that buffer (the order is kept in the temporary files). At this point, all the input table's record have been read and stored in temporary output files but are not in the proper order of the relationship established in the join index which matches the desired $R_2$ records to the saved $R_1$ records. Each of the temporary output files must be merged together based on the original order of the join index offset so that appropriate records will be matched. This will allow the $R_2$ records values to match up with the stored $R_1$ records via the join index.

The temporary output files are then parallel-merged based on the $R_1$ RID values in a manner described in FIG. 2. The parallel-merge operation uses a min-heap tree operation to determine the minimum join index offset value, reads the corresponding $R_2$ records, replaces that value with the next RID from the identified buffer, and finds the new minimum join index offset. The min-heap operation described in FIG. 2 is the preferred way to perform the minimum identification function, although any other minimum identification technique known in the art can be used. The results of the parallel-merge operation will be stored in an output file or group of connected files in step 619. The resulting output file will correspond to the $R_1$ records in the order indicated in the join index. Step 621 checks if there are any more tables to be processed. If there are, then the technique jumps to step 609 and processes the next table in the same manner as for $R_2$. If there are no more tables, then the parallel-join technique is completed.

The parallel-join technique is particularly well suited to be adapted for the use of parallel processing because each of the input tables are processed completely independently. Furthermore, some of the operations on a single table could be parallel processed on multiple processors especially where the input tables are very large. This technique is an advantage over prior techniques which would simply join one table to the next, and then join the resultant intermediate table to the next table. In the current parallel-join technique, all the input tables can be processed at the same time.

FIG. 7 shows three input tables to be joined and a join index which shows the relationship of the records for the join result. The tables in FIG. 7 will be used as a common example of using the parallel-join and multi-slam-join techniques for three or more tables. Table 701 includes records of student names and their course numbers. Table 703 includes records of course numbers and the associated instructor(s) for each course and the course title. Table 705 includes records of instructors and their office numbers. The join operation to be performed in this example will create a result table with all the instructors from table 703 who have common course numbers with a student in table 701, and who have an office or offices according to table 705. The join result will contain columns for Student, Course, Instructor, Title and Office. The join index 707 showing the relationship between the tables for the join result is either pre-existing before a parallel-merge based technique is performed or created with one of several possible techniques. One such technique for creating a join index can be easily extrapolated from the description of FIG. 12. A nested loop for each input table would be used in the technique.

FIG. 7 shows first table 701 ($R_1$) including a column of data entitled Student names 701A and a column entitled Course number 701B. Also included with table 701 is a column of sequential record identifiers 701C which shows the order of the records in the example. Column 701C does not in practice appear with table 701, but is solely present for this explanation. Second table 703 ($R_2$) is a table to be joined with table 701 and table 705, and includes a column of data entitled Course number 703A, a column entitled Instructor 703B and a column entitled Title 703C. Also included only for this explanation is a column of sequential record identifiers 703D which shows the order of the records in this example. Third table 705 ($R_3$) is to be joined with table 701 and table 703 and includes columns of data entitled Instructor 705A and Office number 705B. Also included for this explanation is a column of sequential record identifiers 705C which show the order of the records in this example. For this example, all columns except duplicates in the three input tables will be present in the join result. The join result will then comprise an output table having a Student name column, a Course column, an Instructor column, a Title column, and an Office Number column. Only a portion of the columns present in each input table which are not represented in the join index may be selected to be in the join result. For example, first table 701 may have included a column entitled "Grade" which would not be part of the join result.

The join index 707 shows the relationships of the corresponding records for each input table which will be present in the join result. The join index 707 contains a first column 707A of RIDs for first table 701 records to be joined, a second column 707B of RIDs for second table 703 records to be joined, a third column 707C of RIDs for third table 705 records to be joined, and a fourth column of join index offset values for the join index 707, included only for this explanation which is a column of sequential numbers 707D to show the order of the index entries. In this example, the join index equates the course number of the student in first table 701 with the course number of the instructor in second table 703, and the instructor in second table 703 with the instructor in third table 705. While this example shows the RIDs to correspond to positions in the table, in practice RIDs contain a disk block pointer and an offset value of the record within the block. The join index will be used to read in the input tables sequentially and preserve the required relationships for the join result between the input tables. The columns in the join index do not need to be in any sequential order initially to perform the join operation.

The input tables and join index are stored in a mass storage medium. A mass storage medium is defined as any storage medium besides the designated main memory and could be located separate from the computer housing or in the same physical structure which contains main memory. The mass storage medium may be a disk.

FIGS. 8A–8D show a graphical example of joining three tables using the parallel-join technique. The example shown in FIGS. 8A–8D is not meant to limit the scope of the invention in any way, but is merely provided to help describe the operation of the parallel-join technique when three input tables are joined. The input tables shown in FIG. 7 will be joined using the join index in FIG. 7. The intermediate results and output files will be shown and explained.

Figure 8A:
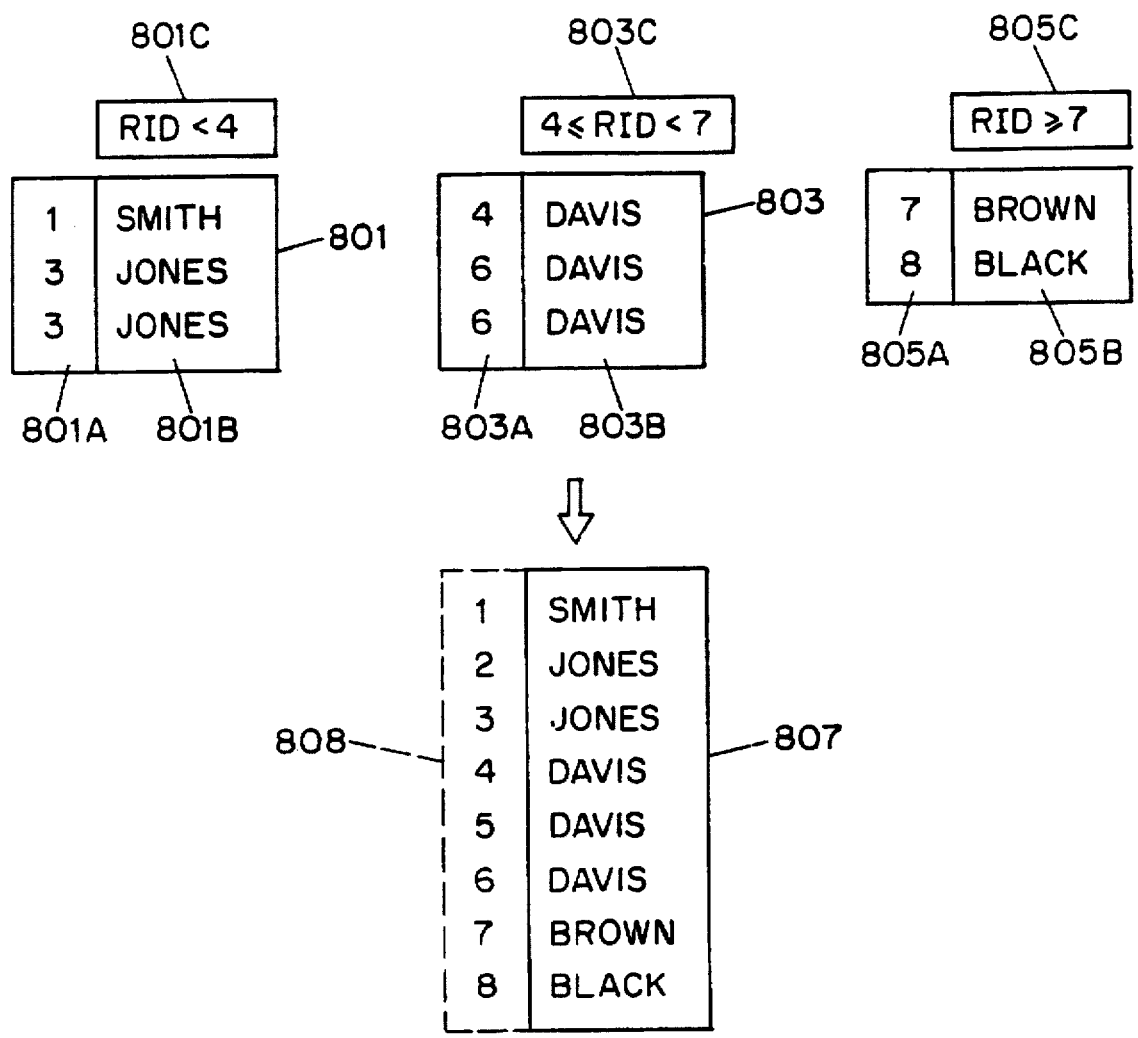
FIGS. 8A, 8B and 8C are graphical representations of part of the intermediate and output files created during the parallel-join method when joining the three tables in FIG. 7.

FIG. 8A shows the intermediate results after processing the first input table 701. The join index 707 contains the RID values for table 701 in numeric order. While a join index will normally be stored in $R_1$ RID ascending order, the join index can be sorted prior to the join operation if required. This example of an application of the parallel-join technique will be described in conjunction with the steps of FIG. 6. Step 601 reads in the RID values from the join index for each of the tables to be joined. Step 603 then partitions the RID values into buffers so that all the records in one buffer can be read into available main memory for the input table at one time. In this example, three records and their associated RID values will fit into available main memory at one time, so that three buffers 801, 803 and 805 are created to distribute the records accordingly. Conditions are then calculated based on the RID values from the join index to distribute approximately equally the records among the three created buffers. Condition 801C includes all RID values which are less than four. Condition 803C includes all RID values which are greater than or equal to four and less than seven. Condition 805C includes all RID values greater than or equal to seven. In this example, the conditions distribute the records from the first input table with their RID values into each buffer. The distribution is not exactly equal because some RIDs are repeated in the join index for the first input table.

Buffer 801 contains a record portion 801B and a RID portion 801A. Buffer 803 contains a record portion 803B and a RID portion 803A. Buffer 805 contains a record portion 805B and a RID portion 805A. The technique then reads in the records from the first input table 701 and stores the records temporarily in the appropriate buffer based on the fulfillment of the buffer conditions. Since the join index was originally in numerical order for the first input table 701, the $R_1$ RIDs for each partition will also be in numerical order. Therefore, the records can be read in sequential order without any further sorting. If a RID is repeated in a particular buffer, the record will only be read once from the first input table 701 and a duplicate record will be stored in the buffer corresponding to any other RIDs. Step 605 of the technique described in FIG. 6 is performed by first reading the records from buffer 801, then buffer 803 and finally buffer 805. Buffer 801 will contain three RIDs and three records ((1,Smith), (3,Jones) and (3,Jones)), where the Jones records was only read once and copied to the third record in buffer 801. After a buffer is filled with all the records which fulfill its condition, it is written to an outside output file (corresponding to step 607 in FIG. 6). The final output file 807 will be one continuous file containing all the selected records identified in the join index after the parallel-join operation is complete. The positional values 808 in the output file 817 are for this explanation only and are not included in the output file itself. Alternatively, a location table can be formed for the same purpose. While the technique described in FIG. 6 and this example is for one processor, multiple processors could be use to speed up the processing time by processing each of the partitions concurrently on different processors.

Figure 8B:
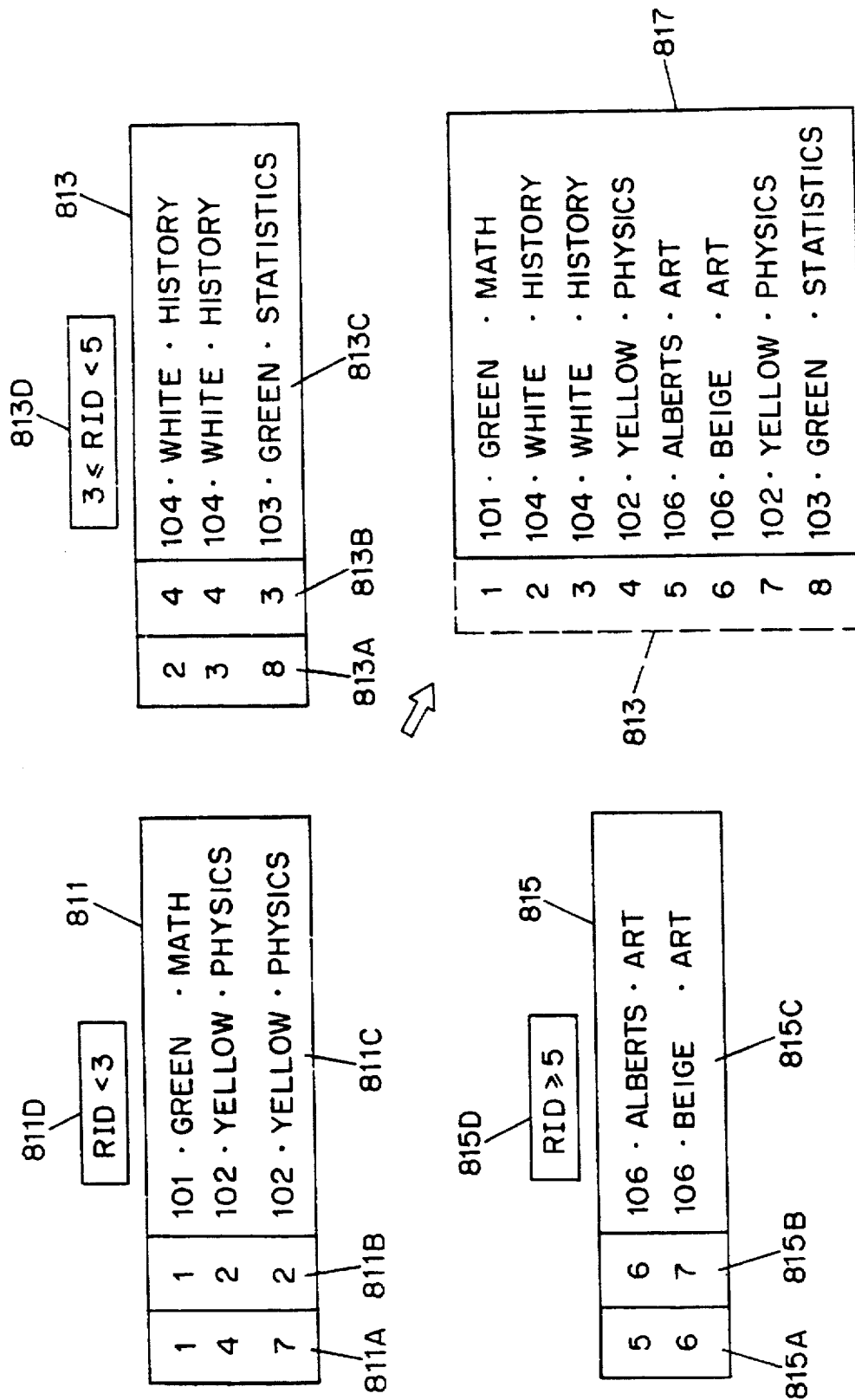

FIG. 8B shows the intermediate results of processing the second input table 703. The steps in FIG. 6 corresponding to the processing of second input table 703 are steps 609 through 621. The processing for the second input table 703 can be performed completely independently of any other input table. If the parallel-join operation is implemented on independent processors, the join index may have to be read for each processor. The separate processing allows the parallel-merge technique to be well suited for parallel processing applications. However, it is not a requirement to parallel process in order to achieve efficient results.

Step 609 partitions the records to be included in the join index from the second input table 703 into three separate buffers, each of which will fit into available main memory alone when the records corresponding to the RIDs from the join index are read into available main memory. Buffer 811 contains records column 811C, second table 703 RID values column 811B, and a join index offset corresponding to first table 701 RID values column 811A. The $R_1$ RID values are stored in order to preserve the relationship in the join index between each of the input tables. The buffer condition 811D includes all RIDs with a value less than three. Buffer 813 contains record column 813C, second table RID column 813B, a join index offset corresponding to first table RID column 813A, and buffer condition 813D which includes all RID values greater than or equal to three and less than five. Buffer 815 contains record column 815C, second table RID column 815B, a join index offset corresponding to first table RID column 815A, and buffer condition 815D which includes all RID values greater than five. The three buffer conditions distribute approximately equally the records among the buffers. Buffer 811 is allocated three records, buffer 813 is allocated three records and buffer 815 is allocated the remaining two records.

Each of the second table RID columns are stored in an outside file to retain the original order (corresponding to step 611). Alternatively, and depending on the size of the join index, the second table RID values can be stored in temporary files in main memory. Also during step 611, the second table RID values are sorted in order to allow the $R_2$ records to be read sequentially from an outside storage medium into available main memory. Once the technique has read all the records identified in a buffer's second table RID column, the contents of the buffer are stored in an output temporary file. The temporary file is then reordered by sorting according to the according to the $R_1$ RID values. In this example, the $R_1$ RID columns are 811A, 813A and 815A. Buffers 811, 813 and 815 in FIG. 8B are shown at this stage in the technique, after all the records are read and the records and RID values are placed in their original $R_1$ RID order.

The three buffers are then parallel-merged using the min-heap technique explained with FIG. 5 based on the values of the join index offset columns 811A, 813A and 815A (using the positioned columns as the merge files in FIG. 5). The join index offset values are placed in a min-heap tree form to identify the lowest value. The corresponding record is then written from its buffer to its final output file 817. The final output file will be one continuous file or group of files containing the records associated with the positional values in each buffer for the second input table. The positional values 818 in the output file 817 are for explanation purposes only and are not included in the output file itself.

Figures 8C, 8D:
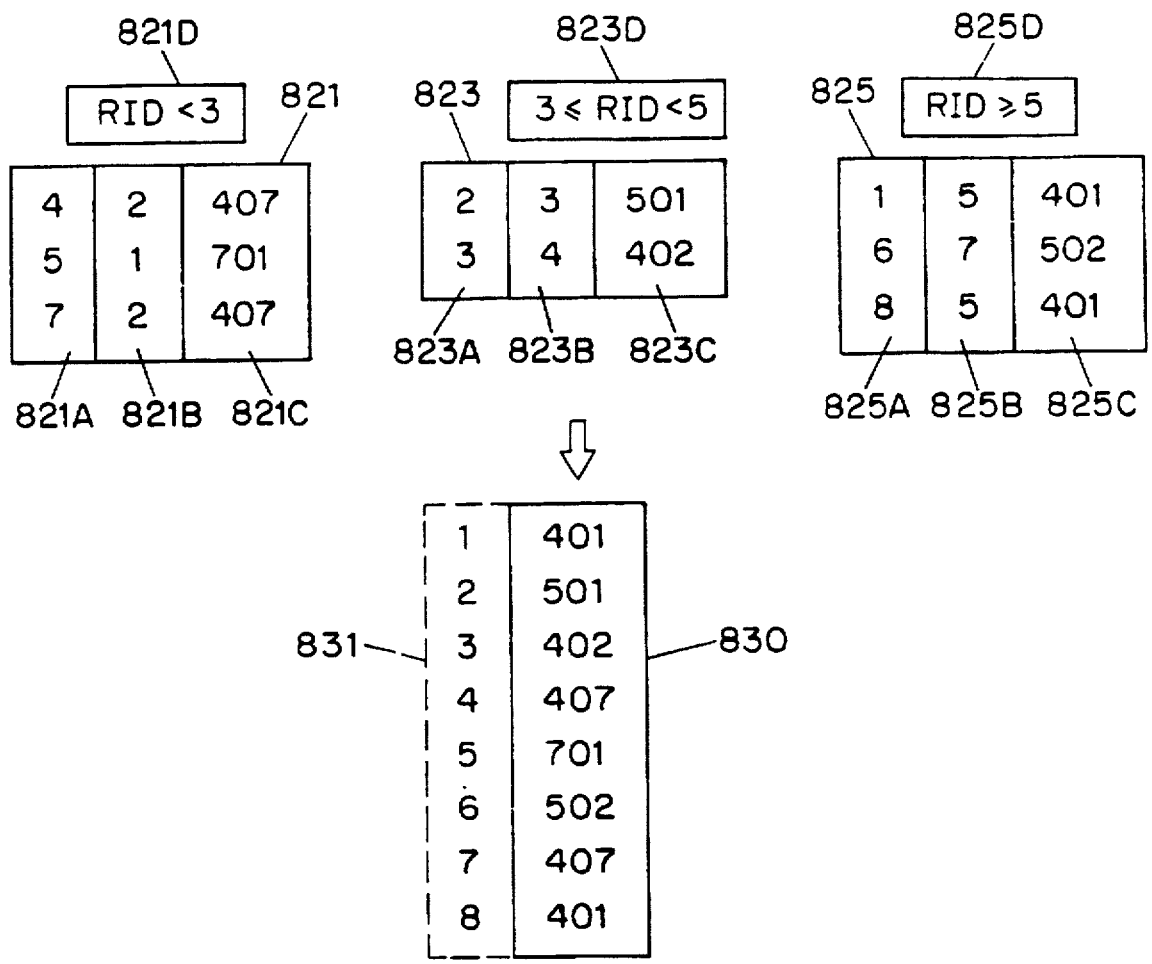
FIG. 8D is a graphical representation of the join resort of the three tables and join index in FIG. 7 using the parallel-join method.

FIG. 8C shows the intermediate results for the processing of third table 705. Steps 609 through 621 of FIG. 6 are repeated for this third input table. Three buffers are formed and are shown as buffers 821, 823 and 825. Buffer 821 contains record column 821C, third table RID column 821B, join index offset column 821A, and buffer condition 821D which includes all RIDs which are less then three. Buffer 823 contains record column 823C, third table RID column 823B, join index offset column 823A, and buffer condition 823D which includes all RID values greater than or equal to three and less than five. Buffer 825 contains record column 825C, third table RID column 825B, join index offset column 825A, and buffer condition 825D which includes all RID values greater than or equal to five. The three buffer conditions distribute approximately equally the records among the buffers. In this example, buffer 821 is allocated three records, buffer 823 is allocated two records and buffer 825 is allocated three records.

The join index offsets and $R_3$ RIDs are then saved in their original order for later use (corresponds to step 611). Each buffer is then sorted according to the value of the third table RID values. The sorted RID values allow for sequential reading of the third input table records. The technique then reads in the third input table 707 records for each RID value in each buffer. In this example, each of the buffers will be read in turn starting with the lowest RID values. However, multiple processors could be used to process each partition simultaneously. After the records are all read into available main memory into one appropriate buffer, they are written to a temporary output file (corresponding to step 615). The records are stored in their original $R_3$ RID positional number order based on the sorted $R_1$ RID order. The partitions in FIG. 8C are shown in their original positional number order. This ensures that the third input table 707 records will correspond to the other records indicated in the join index.

The three partition temporary output files are then parallel-merged according to the join index offset preferably using the min-heap technique described with FIG. 2. Other techniques well known in the art for identifying the lowest value of multiple values could now be used. When the lowest value is identified by the min-heap tree structure, the corresponding record is written to the final output file 830 (corresponding to step 619 of FIG. 6). Output file 830 will contain all the third input table 707 records identified in the join index situated in the order of the join index. The positional numbers 831 are present in file 830 only for explanation purposes and do not appear in the actual file.

The output files 807, 817 and 830 are vertically fragmented in that each file is stored separately from the others. They are shown together in FIG. 8D. This allows each input table to be processed separately which reduces the number of times the input records are read and written to output files and allows for better use of parallel processing. The output files are in the exact order of the join index for the parallel-join technique.

The second technique for processing three or more input tables will now be described and is called the multi-slam-join technique. This technique uses elements of the slam-join technique described in FIG. 1 with elements of a second technique for joining tables using a join index. That second technique, called jive-join, is described fully in the parent U.S. application Ser. No. 08/531,789.

Figure 9A:
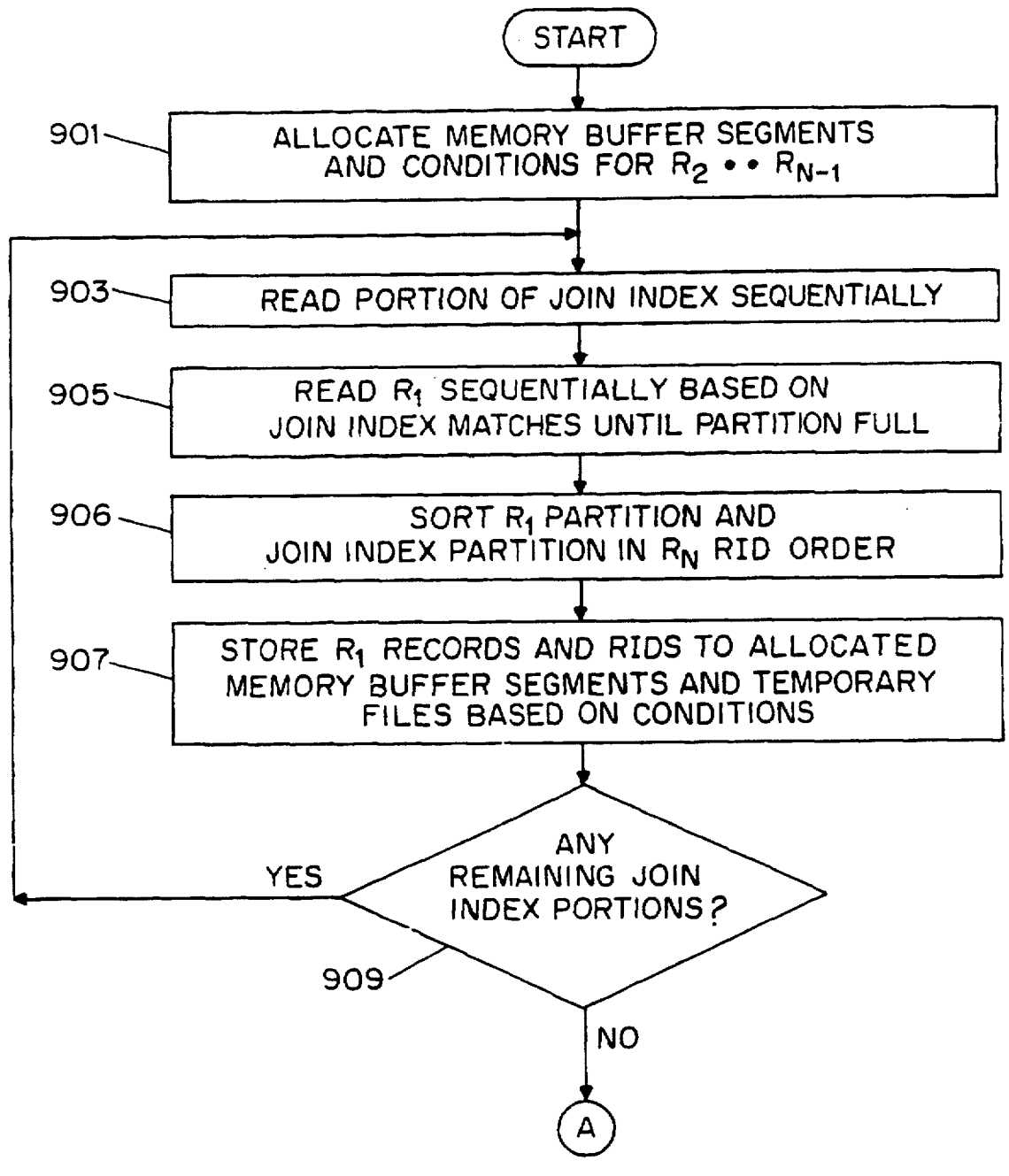
FIGS. 9A and 9B are a flow chart of the multi-slam-join method in accordance with the invention.
Figure 9B:
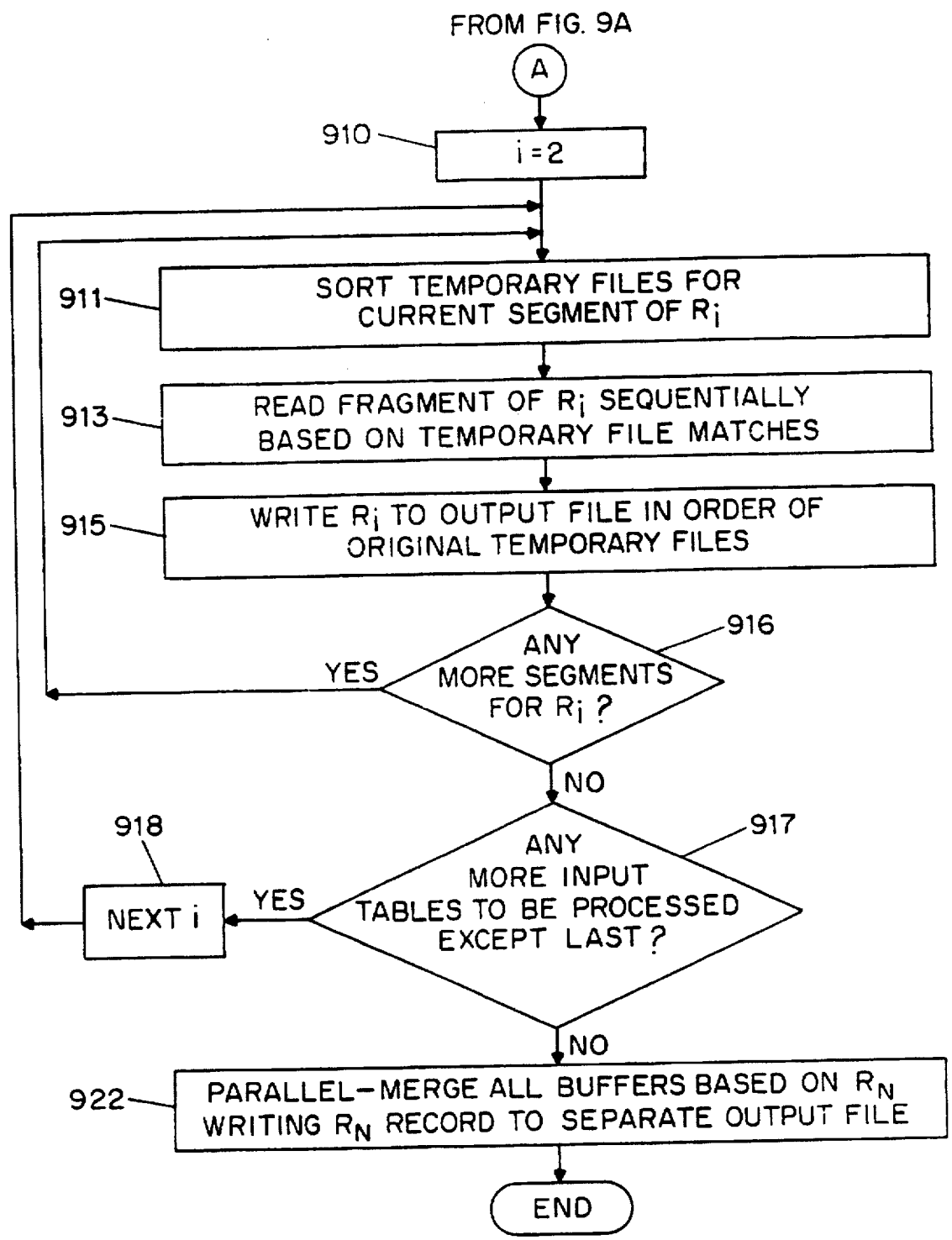

FIG. 9 is a flow chart showing the steps performed in the multi-slam-join technique for joining multiple tables. The tables will be designated $R_i$ where i is the table number and there are N tables to be joined. Step 901 allocates the available main memory used by the processor into partitions called buffers and assigns conditions for each buffer for tables $R_2$ to $R_{N-1}$ (designated the "intermediate tables"), such that all the unique records fulfilling each buffer condition for each intermediate input table will fit into available main memory at one time later in the technique. The $R_1$ records will be allocated according to which pass they were read into memory. The last table to be joined will not participate in the initial buffer allocation. The buffers themselves will only hold a portion of the selected records as explained below and all the allocated buffers will exist simultaneously in available main memory in the initial steps of the technique.

Main memory is a relatively fast access memory associated with a central processor and is preferably RAM. Available main memory is that portion which is not allocated to another function or to another user in a multi-user computer system. The number of buffers is determined by the total number and size of unique selected records to be read from each input table except the last input table. That number can be easily calculated from the join index. The number of buffers is not related to the records of the last input table. The number of buffers added by processing $R_1$ will be determined during the join operation. Because the preferred number of input tables is three or more for the multi-slam-join technique, the buffers will be cross-allocated with respect to each input table's records. The number of buffers created will then be the product of the relative size of the records to be read from each input table (except for the last table) to the size of main memory. The records for the first table are not initially part of the buffer allocation, although buffers will be created using the multi-slam-join technique by reading in all the records and RIDs that will fit into available main memory. A group of buffers will be formed called segments (further shown in FIG. 10). A segment consists of all the records which will fulfill one condition for an input table, in this case all the records read in one pass. Thus the allocation for the first input table is based not on an initial allocation, but upon the number of records from $R_1$ which fit in available main memory as the records are being processed, thereby saving the step of calculating the allocation for the first input table. For example, if the number of records read in the first input table is three times as large as available main memory (requiring three passes), and the number of records to be read in the second input table and third input table are both twice as large as available main memory, twelve buffers will be created (3×2×2=12). Four buffers will be initially created for the second and third input tables and the remaining buffers will be created for each pass of reading in the $R_1$ records. Some portion of the main memory is reserved for more efficient sorting operations and temporary files which will decrease the size of available main memory which can be partitioned.

Each buffer is then assigned conditions for each input table based on the value of the record-identifiers (RIDs) in the join index for tables other than the first and last table. The conditions for the first table are established when the first table records are read into available main memory. There are no conditions for the last input table. The conditions ensure that each group of buffers for a given condition (also called a "segment") in the multi-join (three or more table being joined) case will receive a substantially equal number of participating records from each of the input tables in relation to the other conditions for that particular input table. The conditions are chosen so that the total size of the unique records for a segment fit in main memory. For example, if there are two conditions for the second input table, each segment corresponding to that condition will be allocated half the second input table records. The allocation process and the multidimensional buffering will be explained in depth with respect to FIG. 10. Examples of performing these allocations are shown in the discussion of FIGS. 11A–D.

Step 903 reads a portion of the RIDs in the join index sequentially into available main memory. The join index identifies related records between all the input tables which will be included in the join result. The join index indicates the record's RID (the RID can be a record's physical or virtual location) of the related records in their tables. For clarity of exposition, the RID combination of (1,3,5) indicates that the first record of the first table is related in the join result to the third record of the second table and to the fifth record of the third table.

Step 905 reads disk blocks containing the records from the first table $R_1$ selected by the memory-resident portion of the join index into main memory sequentially, and only reads disk blocks containing records present in the join index and therefore needed for the join result. If a record in $R_1$ is not in the join index, that record should not be present in the join result, and a disk block is therefore not read into main memory if the records contained therein are not selected records. The records from $R_1$ are always in sequential order relative to the join index because the join index was ordered based on $R_1$. Sequential and discriminate access of disk blocks helps reduce I/O operations and time costs due to seek/rotational latencies. The $R_1$ records and identifiers are read into available main memory until the memory is full.

Step 906 sorts the $R_1$ partition and join index partition in $R_N$ RID order.

Step 907 stores the selected records for $R_1$ corresponding to the join index in one of the buffers based on the previously calculated conditions for each intermediate input tables $R_2$ to $R_{N-1}$. At the same time the records are written to a buffer, the join index entries for $R_2 \ldots R_N$ are written to temporary files associated with each buffer. The $R_1$ records and $R_2 \ldots R_N$ RIDs are written in $R_N$ RID order. For example, if there are four input tables, the records of $R_1$ would be categorized based upon their value of the $R_2$ and $R_3$ RIDs in the join index. The $R_2$, $R_3$ and $R_4$ RIDs would be written to temporary files associated with the designated buffer. When a group of buffers associated with one pass of $R_1$ becomes full after the completion of a pass, the data is "flushed" or written to a mass storage disk at a predefined location. The data is organized by individual buffer. The data will be written to contiguous regions of related data in the mass storage disk. The term mass storage disk again refers to any storage medium which is not RAM.

When the portion of $R_1$ records corresponding to the join index in the first pass has all been written to the appropriate buffers and the buffers are flushed, the portion of the technique for processing the first pass of $R_1$ records is complete. When additional $R_1$ records are read in subsequent passes, they will form a new segment as part of the buffering scheme for the $R_1$ records. This allows the $R_1$ records to be processed in a batch type process, processing all the lowest RID values for $R_1$ first. The join index entries for $R_1$ are always in sequential order starting out. If they are not, a sort can be performed on the join index to place the index in $R_1$ RID order.

Step 909 checks if there are any more portions of the join index which have not yet been processed to be read. If there are remaining portions, the technique jumps to step 903 and starts another pass with a new segment for $R_1$. If the join index has been completely read and processed, then the technique goes to step 911. When all the $R_1$ records from the input table have been flushed to disk and stored in output files corresponding to each buffer, the processing of the $R_1$ records of the join result will be complete and stored in a number of output files equal to the number of buffers. The buffers themselves will now be empty. The buffers can then be unallocated from available main memory and are not required in the remaining steps of the algorithm. The $R_1$ output files are then logically linked together by pointers from the end of one file to the beginning of another. Alternate ways of linking files can also be used such as a conventional location table identifying the start of each output file. By storing the results of the join operation for the $R_1$ records separately from the other tables' records, the results will be vertically fragmented.

Initially, the second input table is then processed (i=2) as described in step 910. The order of processing the intermediate tables (not the first and last table) does not have an effect on the efficiency of the multi-slam-join technique. Steps 911 through 918 will be used to process intermediate tables $R_2$ through $R_{N-1}$. The last table $R_N$ will be processed using elements of the slam-join technique.

Step 911 reads in turn the temporary files corresponding to a segment, which is a group of temporary files associated with one condition for an input table. The temporary files contain record identifiers from the join index for a given input table. The temporary files are read into memory and each segment (associated group of temporary files) is sorted by the appropriate RID for the given input table. The original temporary files in the segment are preserved for later use. The sort routine places the appropriate RIDs from the temporary file in numerical order. The RIDs can be sorted with any known technique, such as a quick sort routine which is well known in the art. Multiple temporary files associated with one condition for one input table are read together and a single combined sorted version is created (see FIG. 10 and corresponding explanation). Output files corresponding to each buffer are created on a mass storage medium. For each input table number i, where i is 2 to N-1, $R_i$ is then read sequentially into main memory reading only RIDs in the sorted temporary file in step 913. The records of $R_i$ are then written to the corresponding output file in the order of the original temporary file(s) in step 915. The original temporary file(s) preserve the order of each $R_i$ record RID in the join to produce a consistent ordering of the desired join result. The output files for $R_i$ are then joined together by pointers connecting the end of each file with the beginning of the next. Thus the join result is vertically fragmented.

Steps 916 checks if there are remaining segments (corresponding to a group of buffers for $R_i$) which have not been processed. If there are more segments for $R_i$, then the technique jumps to step 911. If all the segments (and thus corresponding buffers) have been processed for $R_i$, then the technique continues with step 917.

Step 917 checks if there are any more tables to be joined which have not yet been read except for the last input table. If there are no more tables, then the technique jumps to step 920 to process the last remaining input table. If other tables remain to be joined, then i is incremented in step 918 and the temporary files for the next intermediate table are sorted based on the RIDs for that table in the join index and steps 911 through 916 are repeated.

Step 922 then performs a parallel-merge operation on all of the sorted temporary files in order to identify the lowest $R_N$ RID value to be read from the last input table. The parallel-merge technique used is the min-heap technique described with FIG. 2 or can be another minimum identification technique well known in the art. FIG. 11 shows an example of the operation extended to multi-slam-join. The parallel-merge operation allows the $R_N$ records to be read in sequentially from the lowest value to highest instead of randomly thereby saving extra I/O operations. The $R_N$ records which were read are then written to the appropriate output file. The output file for each of the buffers for the $R_N$ records are then connected together by either pointers or a location table identifying the memory location of the output files. The order of connection of the output files is the same as the connection order for the output files associated with the other input tables.

The final join result will be vertically fragmented for each joined table in that each input table will have a separate output group of files for the join results for that table. Vertical fragmentation allows each record of the input tables to be written out from main memory only once which minimizes the I/O operations.

Figure 10:
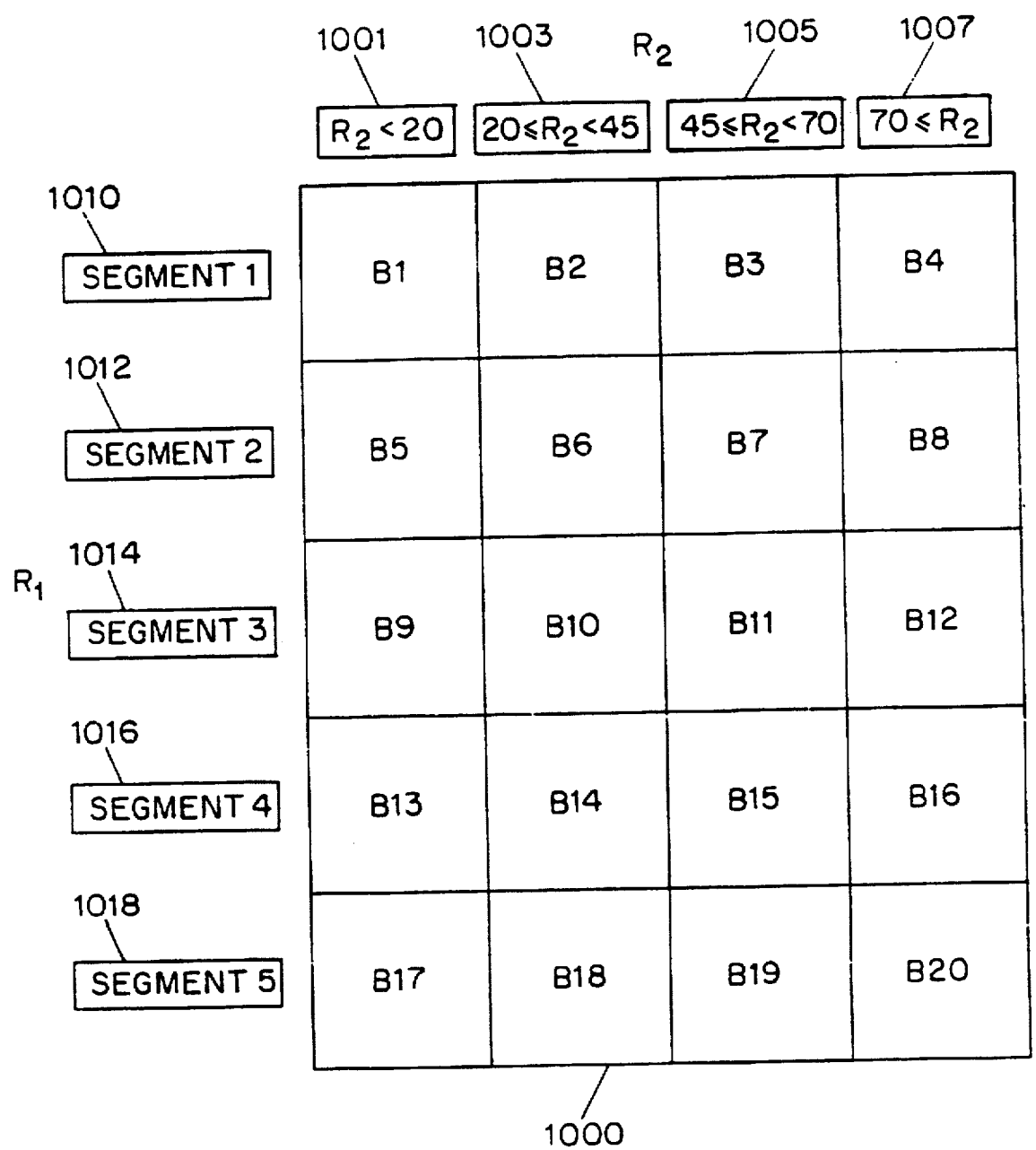
FIG. 10 is a graphical representation of a multi-dimensional buffering scheme used in the multi-slam-join method when three tables are joined.

FIG. 10 shows a buffering scheme for joining three input tables ($R_1$, $R_2$ and $R_3$) using the multi-slam-join technique and is displayed as a grid 1000 containing 20 buffers designated B1 through B20. The records of the first input table and their corresponding $R_2$ and $R_3$ RIDs from the join index will be partitioned by the $R_2$ RIDs. The $R_1$ records are grouped according to segments which contain records which are read into available main memory in a single pass. The $R_3$ records are not conditioned as part of the allocation scheme and are only processed during the final parallel-merge operation in this technique. Along the top of grid 1000 are the determined conditions for sorting the record RIDs of $R_2$. The selected conditions in this example are used to help explain the buffering scheme. Condition 1001 is met when the $R_2$ RID is less than 20. Condition 1003 is met when the $R_2$ RID is greater than or equal to 20 and less than 45. Condition 1005 is met when the $R_2$ RID is greater than or equal to 45 and less than 70. Condition 1007 is met when the $R_2$ RID is greater than or equal to 70. The segments 1010, 1012, 1014, 1016 and 1018 listed on the vertical side of grid 1000 correspond to each of the passes that were required in order to read in all of the $R_1$ records. In this example, five $R_1$ segments were required because the selected records from the first input table were approximately five times the size of available main memory. A segment is not allocated by RID condition for the vertical side of grid 100. This is in contrast to the jive-join technique applied to three or more input tables described in the parent application which required allocating conditions for N-1 tables when joining N tables in one operation.

A join index entry with a value of (1,25,83) being processed in the multi-slam-join technique in this example would read the first record of $R_1$ in the first pass and write it to buffer B2 based upon the values of the $R_2$ RID in which pass the $R_1$ record was read. The first $R_1$ record (with an RID of 1) is read in the first pass for this example so will be part of the first segment 1010. The $R_2$ RID is 25 which fulfills condition 1003 for $R_2$ by being between 20 and 45. The $R_3$ RID has no effect on which buffer the $R_1$ record and associated temporary files are placed. Each buffer B1-B20 will also have two associated temporary files in which the join index entries for $R_2$ and $R_3$ for the selected $R_1$ record will be separately stored.

A second example is an index value of (50,4,119) which will store the second record of $R_1$ in buffer B9 based upon satisfying condition 1001 for $R_2$ and being in the third pass of $R_1$ records being read in this example. Exactly which segment a $R_1$ record will be placed is based on the number of records being read and the size of available main memory. The $R_1$ records are not placed in a new segment until a previous segment is filled and no available main memory is free to read in more records. When processing the second input table, a number of temporary files will by read together as a segment, where a segment is defined as all the temporary files related to one condition for a single input table. Thus when $R_2$ is read and processed, the temporary files for $R_2$ associated with B1, B5, B9, B13, and B17 will be processed together for condition 1001 as one segment which is read in, sorted, and used to read selected $R_2$ records. Examples of segments for $R_1$ are the $R_2$ temporary files corresponding to (B5, B6, B7, B8) and (B17, B18, B19, B20).

When the $R_2$ records are being processed, the $R_2$ temporary files for each column of buffers on grid 1000 will be read together as one segment to be sorted and used to sequentially read in selected records of $R_2$. The $R_2$ records will then be written to output file(s) based upon the original order of each temporary file associated with $R_2$.

The $R_3$ RIDs stored in their temporary files associated with each buffer will be processed using the parallel-merge operation. All of the temporary files which are ordered by the $R_N$ RID will be parallel-merged such that the lowest remaining RID will be identified and the corresponding $R_3$ record will be read and placed in an output file associated with the temporary file (and original buffer). The order is preserved so that the $R_3$ records will correctly correspond to the records from the other tables in the manner set out in the join index. The parallel-merging step allows the reduction of calculating allocations and conditions for one less input table from the jive-join technique described in the parent application. Because the applications of these techniques are on very large tables, the reduction in the allocation process is potentially a large savings of processing time. Another benefit is the avoidance of skew which saves processing time. Each of the three input tables, either through passes, RID allocation or parallel-merging operations, are all read sequentially form their output files reducing I/O operations and allowing the input records to be read only once and written only once to the output files.

The buffering scheme shown in FIG. 10 can be extended to the case of N tables to be joined by allocating buffers with conditions for each of the input tables except the first and last tables. Thus, when five relations are to be joined, a four dimensional buffer will be allocated. The conditions on RIDs for the three intermediate input tables will be initially calculated for the RIDs of $R_2$, $R_3$, and $R_4$. The remaining dimension of the grid will derive its proper segmentation from the process of reading in the $R_1$ records in a number of passes. Each segment for the $R_1$ dimension will contain as many $R_1$ records as will fit in available main memory. If each table except the first and last table in this five input table example is allocated into three groupings of defined conditions, and it takes four passes to read in all the $R_1$ records thus creating three segments, the number of subsequent buffers in the grid will be the product of the number of conditions and $R_1$ segments, or 4×3×3×3=108.

FIGS. 11A-11D show a graphical example of joining three tables using the multi-slam-join technique. The example shown in FIGS. 11A-11D is not meant to limit the scope of the invention in any way, but is merely provided to help describe the operation of the multi-slam-join technique when three input tables are joined. FIG. 7, referred to in a previous example, shows three input tables to be joined and a join index which shows the relationship of the records for the join result. Table 701 includes records of student names and their course numbers. Table 703 includes records of course numbers and the associated instructor(s) for each course and the course title. Table 705 includes records of instructors and their office numbers. The join operation to be performed in this example will create a result table with all the instructors from table 703 who have common course numbers with a student in table 701, and who have an office or offices according to table 705. The join result will contain columns for Student, Course, Instructor, Title and Office. The join index 707 showing the relationship between the tables for the join result is either pre-existing before the multi-slam-join technique is performed or created with one of several possible techniques. One such technique for creating a join index can be easily extrapolated from the description of FIG. 12. A nested loop for each input table would be used in the technique. The input tables are described in detail in connection with FIG. 7.

Figure 11B:
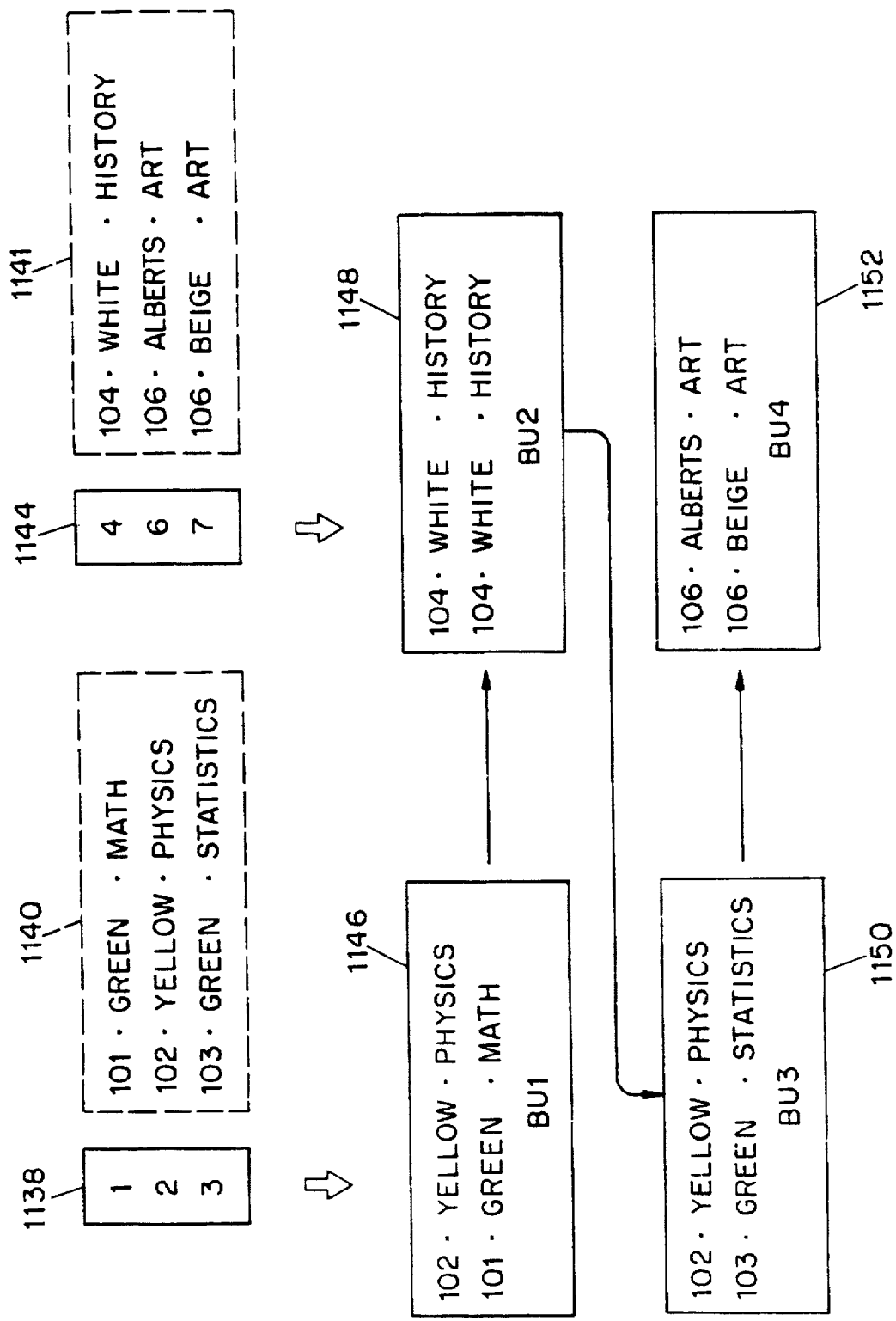

FIG. 11A shows a portion of the intermediate results and output files of the multi-slam-join technique applied to the input tables in FIG. 7 to help describe the operation of the technique. The example shown in FIGS. 11A-11D are of the $R_1$ records ordered by the $R_N$ RIDs as sorted in step 906 of FIG. 9. First, buffers, or memory partitions, are created from the available main memory. The number of buffers is based upon the size of all the unique records indicated in the join index to be joined except for the last table compared to the size of available main memory. The exact calculation for the number of buffers is described in more detail below. The buffer partitions will be allocated according to conditions on second table 1103 RIDs (not the first and last input tables) and the conditions are determined to equally distribute the selected records from the second input table between the segments (groups of related buffers). For this example, each selected record will be the same size.

The first table 701 RIDS, the second table 703 RIDs and third table 705 RIDs all appear in the join index 707 which indicates the matching records between the input tables to be included in the join result. In this example, the number of partitions is determined to be two for second table 703. The defined condition will equally distribute the $R_2$ records among its two partitions so that each segment will fit in main memory. The number of segments to be created for the $R_1$ records is based on the number of $R_1$ records read and the size of available main memory. Once available main memory is filled to capacity with $R_1$ records which matches up a segment, the $R_1$ records and corresponding join index entries are sorted by the $R_3$ RID order and then written to the various buffers. Then another $R_1$ segment is created to be filled. In this example, available main memory will be able to hold four records at one time. As a result, two $R_1$ segments will be required to process the eight $R_1$ records in first input table 701. The total number of buffers that are created is the product of the number of segments for $R_1$ times the number of partitions for $R_2$. In this example, a total of four buffers are created (2×2=4). The buffers are designated as BU1 1109, BU2 1111, BU3 1113 and BU4 1115. In this example, the condition for the first buffer BU1 1109 is defined as the second table 1103 RID is less than or equal to three (shown as condition 1117A) and the $R_1$ record is read in the first $R_1$ segment (i.e., the first pass). The condition for the second buffer BU2 1111 is defined as the second table 1103 RID is greater than three (shown as condition 1117B) and the $R_1$ record is read in the first $R_1$ segment. The condition for the third buffer BU3 1113 is defined as the second table 1103 RID is less than or equal to three (shown as condition 1117A) and the $R_1$ record is read in the second $R_1$ segment (i.e., in the second pass). The buffers are allocated so that the aggregate size of the participating $R_1$ and $R_2$ segments will be close to but not greater than the size of available main memory, and a segment is defined as all the buffers related to one $R_2$ condition or one memory-sized partition of $R_1$. In practice, the allocation of the $R_1$ segments does not occur until the $R_1$ records are being read. The buffer grid in FIG. 11A is used for a conceptual explanation of the multi-slam-join technique.

The next step in the multi-slam-join technique is to read a portion of the join index 707 into the available main memory and to read data blocks containing selected records from the first table 701 only if a record has a corresponding entry in the join index. The join index and the selected records are read concurrently by reading in data blocks containing selected table 701 records which correspond to the join index portion read. During this process of reading in the $R_1$ records, the $R_1$ segments will be created. After the portion of selected $R_1$ records are processed, the next portion of the join index and selected records are read in until the entire join index and selected $R_1$ records are processed. The total number of passes (or chunks of $R_1$ records and identifiers which can be read into available main memory at one time) required in this example is two. To process selected records, each selected record is stored in the appropriate buffer based upon the corresponding second table 703 RID and current $R_1$ segment and the conditions associated with each buffer. Thus the first record in first table 701 (Smith—101) and its corresponding join index entry (1,1,5) will be read from a mass storage disk and written to the first buffer BU1 1109 because the second table 703 RID is one which fulfills the condition 1117A, and the $R_1$ record is being read in the first pass since the record read is the first $R_1$ record from the first input table 701. The intersection of the fulfilled condition and current $R_1$ segment is the first buffer BU1 1109. Another example is the third record in first table 1101 (Jones—104) and its corresponding join index entry (3,4,3) which is read into memory and stored in the second buffer BU2 1111 because the corresponding second table 1103 RID record is four, fulfilling the condition 1117B, and the correct $R_1$ segment is the first segment 1119B. The same $R_2$ record (Jones—104) with the join index entry (3,4,4) will also be placed in BU2 1111 with a different associated temporary files for the $R_3$ RIDs.

First table 701 is read sequentially from a mass storage disk but a particular data block will only be read into main memory if an entry for a record on that block is included in the join index. Referring to FIG. 7, the ninth record of first table 701 (Frick—107) will not be read into main memory because there is no corresponding RID entry in the join index 707 and therefore an I/O operation can be saved. By only reading disk blocks containing those records referred to in the join index which should be included in the join result, many I/O operations can be saved during a join operation when there are many records in the input tables which will not be present in the join result because they are not selected for that particular join.

The $R_1$ records and join index partition are sorted in $R_N$ RID order in main memory. In this example, the two records in first buffer 1109 are reordered and appear in the sorted order.

When each selected record of first table 701 is written to one of the buffers, the corresponding second table 703 RID and third table 705 RID are written to independent temporary files for each input table which are associated with each buffer. The RIDs in each temporary file are stored in the order of the selected last table 705 RIDs. The temporary files 1121 for second table 703 RIDs and temporary file 1122 for third table 705 RIDs are associated with the first buffer 1109; the temporary files 1123 for second table 703 RIDs and temporary file 1124 for third table 705 RIDs are associated with the second buffer 1111; the temporary files 1125 for second table 703 RIDs and temporary file 1126 for third table 705 RIDs are associated with the third buffer 1113; and the temporary files 1127 for second table 703 RIDs and temporary file 1128 for third table 705 RIDS are associated with the fourth buffer 1115. Temporary files 1121, 1123, 1125 and 1127 as a group contain all the second table 703 RIDs which correspond to the buffers. Temporary files 1122, 1124, 1126 and 1128 as a group contain all the third table 705 RIDs which correspond to the buffers.

When a pass of reading $R_1$ records is complete, the $R_1$ segment has reached its maximum storage allocation, and the data in the buffer is sorted and written to a mass storage disk at a predetermined location corresponding to the individual buffers. The available main memory is then cleared of data and ready to accept more data from another pass of $R_1$. The writing of $R_1$ segments will create output files on the disk shown as output file 1130 corresponding to the first buffer 1109, output file 1132 corresponding to the second buffer 1111, output file 1134 corresponding to the third buffer 1113 and output file 1136 corresponding to the fourth buffer 1115. After the selected records from first table 701 are read for every $R_1$ RID in the join index, the selected records of first table 701 which are to be included in the join result will have been stored in output files 1130, 1132, 1134 and 1136 after being flushed from available main memory. The output files will then be connected in a particular order. The order is arbitrary as long as all other output files for the other input tables are connected in the same sequence. In this example, a pointer at the end of output file 1130 is directed to the start of output file 1132. A pointer from the end of output file 1132 is directed to the beginning of output file 1134. A pointer at the end of output file 1134 is directed to the start of output file 1136. The pointers connect the four output files to be one complete output file for the selected first table records. Alternately, other techniques could be used to link the files. At this point in the multi-slam-join technique, the processing on the first table 701 is complete and the results for the first table 701 are stored in its output files 1130, 1132, 1134 and 1136 which are separate from the data related to other input tables in the join result.

FIG. 11B shows a portion of the intermediate results of the next steps in the multi-slam-join technique. The multi-slam-join technique continues by reading the temporary files 1121, 1123, 1125 and 1127 corresponding to second table 703 shown in FIG. 7. The temporary files for each input table except the last are read as segments which include all temporary files that satisfy a given condition for that table. For example, there will be two segments for second table 1103. The first includes all records with a second table 1103 RID less than or equal to three (condition 1117A), which includes temporary files 1121 and 1125. The second segment for second table 703 will include all records with a second table 703 RID greater than three, which includes temporary files 1123 and 1127. Each segment for the second table will therefore include one entire column of temporary files of $R_2$ RIDs in the representation of the buffers for second table 703.

A segment including temporary files 1121 and 1125 is read and sorted in ascending order of the second table 703 RIDs. The duplicate RID values are discarded and the results of the sort are stored in RAM (see file 1138). The original temporary files 1121 and 1125 are retained. The data blocks containing selected records from second table 703 are then read sequentially into main memory based upon the sorted second table 703 RIDs stored in file 1138. The selected records which are read in this example appear in box 1140. Because the second table 703 RID values have been previously partitioned based on defined conditions 1117A and 1117B, all the RIDs relating to records located in the lowest half of the disk locations for second table 703 located in the mass storage medium are read when the first segment is processed. The selected records are then written in the order of the associated unsorted temporary files to output files to ensure that the corresponding records of first table 701 and second table 703 will be stored in the correct order in their output files. The records from second table 703 must be placed in the unsorted order to preserve their relationship with the first input table and other input tables. If the unsorted temporary file lists a second table 703 RID multiple times, such as where multiple records from the first table are associated with one record from the second table, the selected second table 703 record will be written to the output file in all the places identified by the second table 703 RID.

A second segment for the second table 703 made of temporary files 1123 and 1127 is read, sorted by the second table 703 RIDs and duplicate values eliminated; the results of which appear in file 1144 located in RAM (main memory). The data blocks containing records of second table 703 are now read sequentially starting at the lowest value of second table 703 RID in the segment (the segment includes buffers BU2 1111 and BU4 1115) and stored in main memory. The selected records which are read appear in box 1141. The selected records are then written to the output file in the order of the unsorted temporary files 1123 and 1127 associated with the segment being processed.

The results of performing the multi-slam-join technique for the second table 703 are then stored in the join result for second table 703 in output files 1146, 1148, 1150 and 1152. A pointer is located at the end of output file 1146 directed to the beginning of output file 1148. Pointers connecting the other files create an equivalent single file for the join result for second table 703. The first table 701's join result files 1130, 1132, 1134 and 1136 sequentially correspond with the second table 703's join result output files 1146, 1148, 1150 and 1152, respectively, and would form a table if the output columns were concatenated. Thus the second record in output file 1130 corresponds to the second record in output file 1146 and the same is true throughout the output files.

Figure 11C:
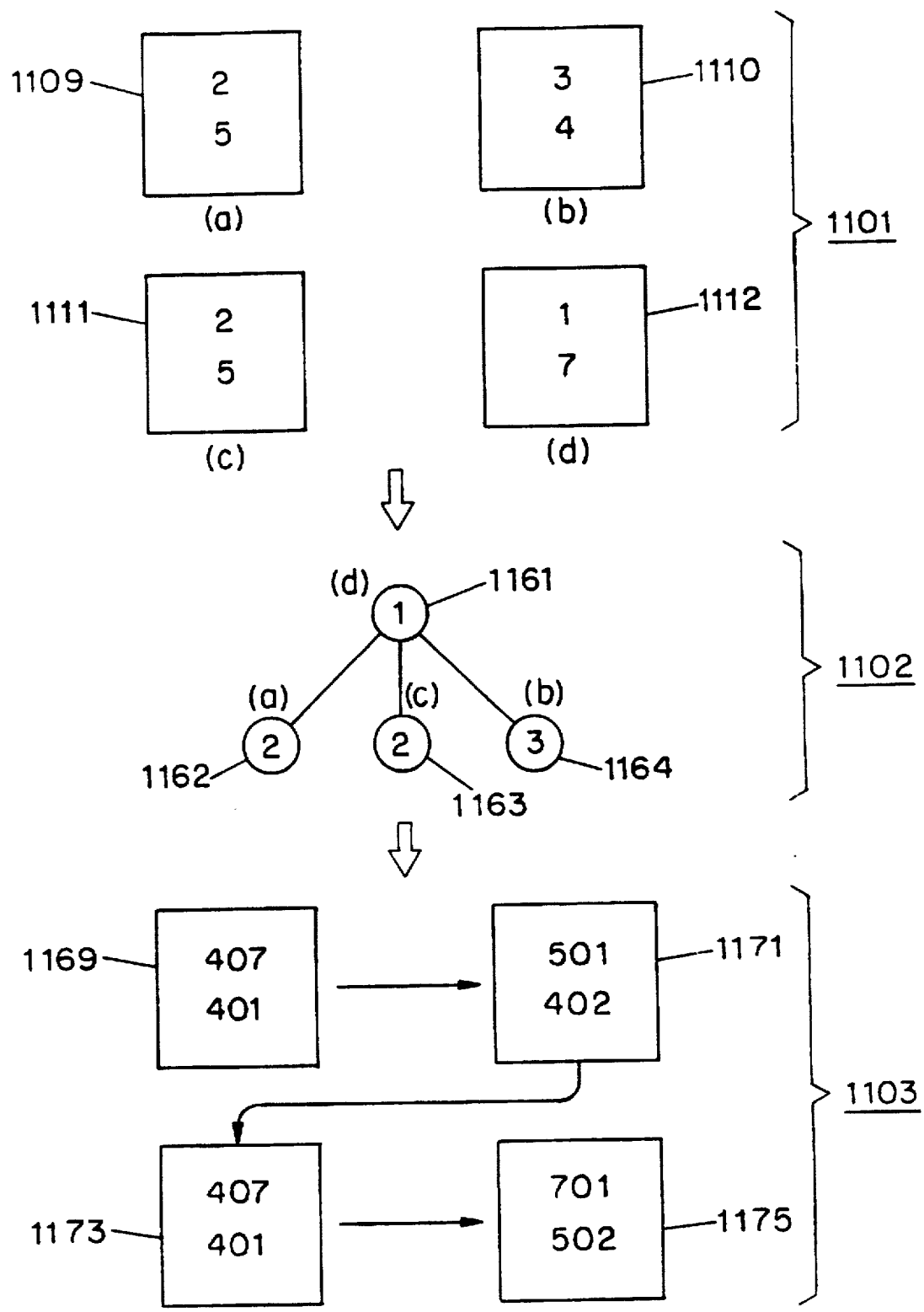

FIG. 11C shows the intermediate results of processing third table 705, the last table to be processed. The third table 705 RID values have not been partitioned and will be proceed using the parallel-merge technique described with FIG. 2. Each of the temporary files for the third table 705 RID's 1122, 1124, 1126 and 1128 are already sorted in numerical RID order for each temporary file. The temporary files are shown in FIG. 11C collectively as file group 1101. Specifically, the individual file 1109 (designated as "(a)") corresponds to temporary file 1122, file 1110 (designated as "(b)") corresponds to temporary file 1124, file 1111 (designated as "(c)") corresponds to temporary file 1126 and file 1112 (designated as "(d)") corresponds to temporary file 1128. In practice, the RIDs from the temporary files would be placed in merge files in available main memory as described with FIG. 2. In the example, only the temporary files will be referred to. The lowest value RID from each individual file is then placed in a min-heap structure used to efficiently identify the lowest value RIDs in all temporary files. The initial min-heap tree structure, which was described in detail in FIGS. 2 and 5, is shown applied to this example as min-heap tree 1102. The min-heap tree 1102 contains nodes corresponding to the lowest value in each of the sorted temporary files. If a temporary file contains no RID values, then there will be no corresponding node in tree 1102. In this example, node 1161 corresponds to temporary file 1128, node 1162 corresponds to temporary file 1109, node 1163 corresponds to temporary file 1111 and node 1164 corresponds to temporary file 1110.

The identified lowest RID value is then read from third table 705 from an outside disk into available main memory and placed in a buffer (allocated memory partition) associated with the temporary file whose RID value was identified as the smallest. The identified minimum node is then removed from the min-heap tree structure and replaced with the next value in the sorted temporary file of the just identified minimum RIDs, if any. The tree structure is then reorganized to find the next minimum value. The process continues in this manner until all the RID values which correspond to a third table 705 record have been processed and all the identified records have been read. When one of the buffers associated with each temporary file exceeds a predetermined limit, the buffer will be "flushed" to an outside disk. The order of the records is important because the third table 705 records must correspond to the other two input tables in accordance with the join index.

The output files for the buffers corresponding to the third table 705 temporary files are shown in file group 1103.

Specifically, output file 1169 corresponds to temporary file 1122, output file 1171 corresponds to temporary file 1124, output file 1173 corresponds to temporary file 1126 and output file 1175 corresponds to temporary file 1128. The output files are connected in the same manner as the output files for the other input tables. A pointer is located at the end of output file 1169 directed to the beginning of the output file 1171. Pointers connecting the other files create the equivalent of a single file for the join result of third table 705. The first table 701 and second table 703 join result files sequentially correspond with the third table 705 join result files and would form a table consistent with the join index if the output columns were concatenated. The output files for first table 701, second table 703 and third table 705 are stored separately to enable each input table to be processed separately. These separated files are vertical fragments of the join result. Vertical fragmentation allows a reduced number of I/O transfers by only once reading and writing first table 701, second table 703 and third table 705 and not requiring other I/O accesses to construct a join result. Join result tables which are vertically fragmented by columns can be easily combined for random access when generating an index for the join result. For sequential processing of the join result, there is only an insignificant overhead of having several vertical partitions compared with a non-partitioned representation.

The join result of applying the multi-slam-join technique to the three input tables and join index in FIG. 7 is shown in FIG. 11D which consists of the vertically fragmented output files 1180, 1181 and 1182 where file 1180 contains the join results for the first table, file 1181 contains the join result for the second table and file 1182 contains the join result for the third table. Each of these output files are made up of their four individual output files logically connected by pointers or connected using an alternate technique.

The first table to be joined in the multi-slam-join technique should preferably be the smallest table because the number of segments for the first table is defined by how many passes are necessary to read in all of the first table records identified in the join index. Minimizing the number of first table segments (by reducing the number of passes) is a efficient way to minimize buffer allocations and temporary file manipulations. The last table should preferably be the largest input table because the buffering scheme does not rely on the size of the records for the last table. The last table to be joined avoids the need for an allocation step and condition generation for that last table. The buffer allocation allows the multi-slam-join technique to be more efficient in processing input tables because of reduced I/O operations than if input tables were simply joined together one at a time. The present technique allows for fewer I/O operations for each of the input tables because the buffering structure allows each input table to be read sequentially and the output is vertically fragmented. Moreover, there are no additional I/O operations for intermediate join results in the multi-slam-join technique which would be required if each table was joined one at a time to each other. In most cases, the multi-slam-join is an improvement over the jive-join technique applied to joining multiple input tables described in the parent application because one pre-processing allocation step for an input table is eliminated. In its place, a parallel-merge operation is performed.

Figures 12B, 12C:
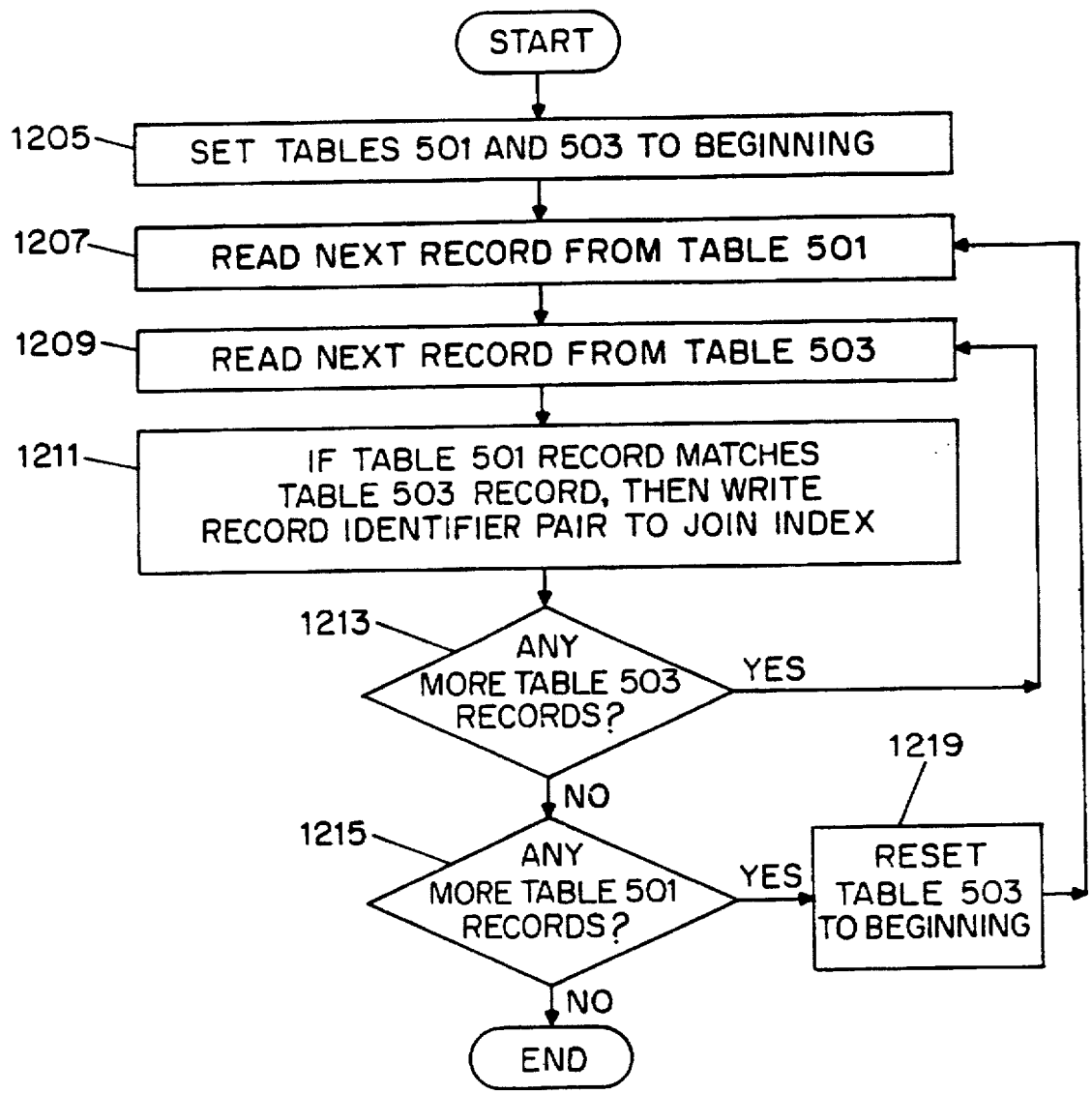
FIG. 12B is a flow chart of the steps of the nested loop method which creates a join index for two tables.
FIG. 12C is a graphical representation of the join index created by the method shown in FIG. 12B when applied to the input relations shown in FIG. 12A.

FIGS. 12A–12C graphically illustrate the steps for generating a join index for two input tables if a join index is not present. A join index of some type is required to implement the slam-join, multi-slam-join, or parallel-join techniques. The method described here is an example of generating a join index using a nested-loop, and is only one of many ways to accomplish this task. The nested-loop method could be easily expanded to forming a join index on three or more input tables.

FIG. 12A shows two tables from which a join index is to be formed by matching the course numbers. Table 1201 contains four records of course numbers and student names. Table 1203 contains six records of course numbers and instructors. The sequential numbers next to the tables indicate the record identifiers. During the operation of this nested-loop technique, each record of table 1201 in the Course number column will be compared against each record of table 1203 in its Course number column, and if a match occurs, the relationship will be saved in the join index.

FIG. 12B shows a flow chart of the method for generating the join index using the nested-loop technique. Step 1205 sets a record indicator for table 1201 and a record indicator for table 1203 both to predefined location of the first record in their respective tables. Step 1207 reads in a record of table 1201 which is the first record of the first table 1201 in the beginning of this process. Step 1209 reads in a record of table 1203, which is the first record of table 1203 in the beginning of this process. In step 1211, the records read in steps 1207 and 1209 are compared. If the records are equivalent and match, the record identifiers of the two records are written to the join index. Step 1213 checks if there are any more records from table 1203 which have not been read for the current table 1201 record. If there are no more records, the process goes to step 1215. If there are more records in table 1203, then the process jumps to step 1209 to read the next record from table 1203. Step 1215 checks if there are any more records from table 1201 which have not yet been read. If there are more records, table 1203 is reset to the beginning in step 1219. The reset operation can be performed by moving a pointer back to the first record in table 1203. The process then jumps to step 1207 and reads the next record from table 1201. If in step 1215, there are no more records to be read in table 1201, the process is finished. Thus, each record of table 1201 is compared to each record of table 1203. The process produces a table of record identifiers (join index) showing the pairs that would be joined if a join operation was performed using the chosen join column. The join index produced for the input tables in FIG. 12A for matching course numbers is shown in FIG. 12C as join index 1230.

Figure 13:
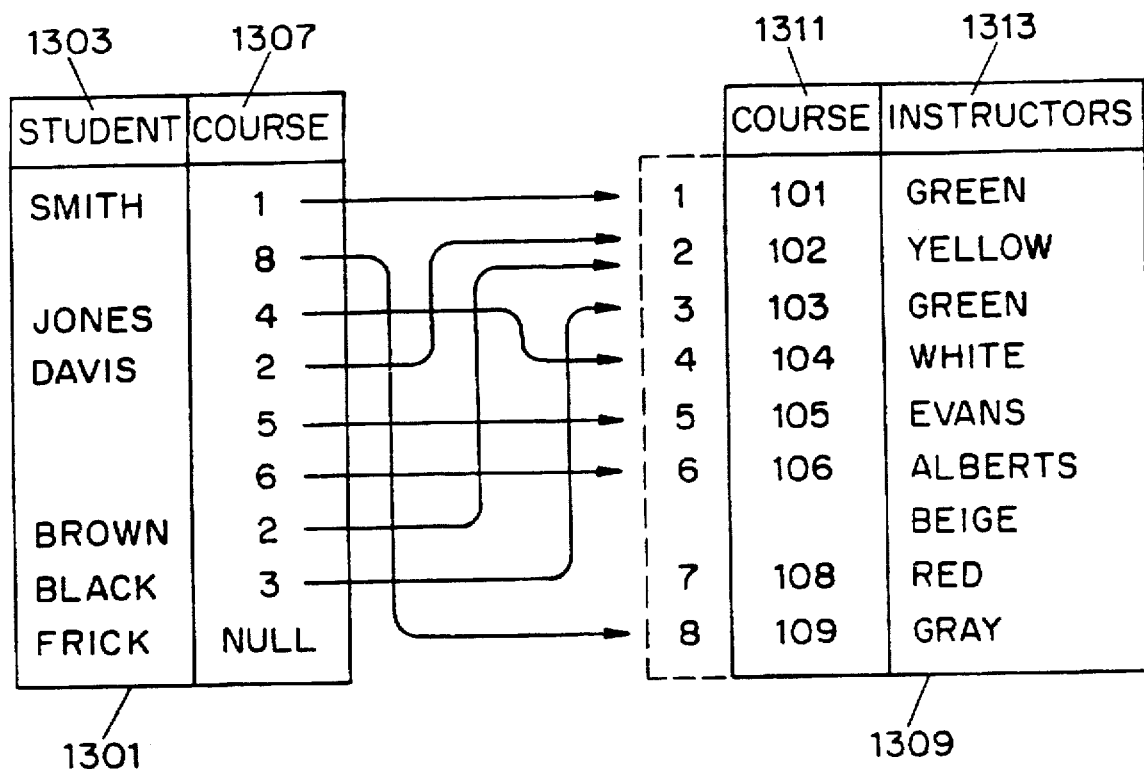
FIG. 13 is a graphical representation of two input object collections in an object-oriented data base.

FIG. 13 is a graphical representation of tables stored in an object-oriented database. The slam-join, multi-slam-join and parallel-join techniques are applicable to object-oriented databases. The previous examples described with FIGS. 4, 5, 8 and 11 correspond to relational databases where data is stored and indexed relative to other related data. In object-oriented databases, record identifiers are kept within other records to identify the relationships of data. Data related in subject matter are kept as groups of data, which is an equivalent to a table of data in a relational database. If a separate join index relating one group of data to another is present in the database, then the slam-join, multi-slam-join and parallel-join techniques work the same way as described previously.

FIG. 13 shows a variation of a join index that may occur in object-oriented databases. The join index becomes part of the first group of data as an additional column in the group and contains pointers to a second group of data from which a join result will be formed. In FIG. 13, first table 1301 contains a first data column 1303 of Student names and a second data column 1307 of Index entries pointing to second table 1309 which are associated with the records of table 1301. The second table 1309 contains a first data column 1311 of Course numbers and a second data column 1313 of Instructors. Although the data is described in columns in this example, the data may not actually be stored in that format in object-oriented databases. The desired join result is a table including the student name, course number, and instructor. The index numbers in index 1307 point to the related entry in table 1309 which has a matching course number and one or more instructors.

The slam-join, multi-slam-join and parallel-join techniques are well suited to object-oriented databases because the join index does not need to be read in first in order to allocate the available main memory as in the jive-join technique described in the parent application. In the parallel-merge type techniques, as many records from table 1301 with their pointers as will fit in available main memory will be read at one time and then sorted by the embedded RIDs for the second table. The RIDs for second table 1309 will then be parallel-merged in the manner described in FIG. 2. The partitions for the first input table are created by the number of passes required to read in the first input table and therefore the operation of performing the slam-join operations in an object-oriented system should be the same as in a relational database system.

The multi-slam-join technique will require slight modification in the object-oriented system because the middle input tables (not the first and last input tables) will require partitioning prior to the join operation. The parallel-join technique requires the same modification. A join index could be constructed for the middle input tables. However, in the object-oriented world, it may not be desirable to read in all of the middle input tables in order to obtain the join index relationship. Instead the buffers can be divided evenly to approximate the output distribution. If significant skew occurs in the records of the middle tables 1309 due to varied record size or repetition, the performance of the technique will decrease. An alternative solution is to sample the objects of the middle tables to get their index pointer values. Given that the input tables are very large for optimal use, the sample would only need to be a small portion of the entire table to statistically calculate an allocation that is close to optimal. Once the allocation of the buffers based on the middle tables' RIDs is made, the multi-slam-join technique is performed in the same manner as described in FIG. 9. The first table records including their corresponding RIDs to all other participating tables will be read in together.

The slam-join, multi-slam-join and parallel-join technique will be operable in any database system which includes at least one way to logically connect groups of data together. The technique is not limited in applicability to relational and object-oriented databases which have been described in the examples provided herein.

Figure 14:
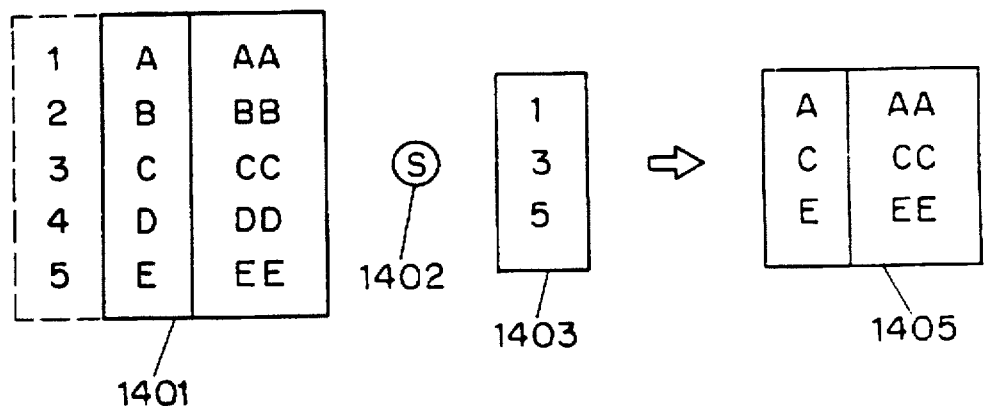
FIG. 14 is a graphical representation of a local selection which can be used in conjunction with the slam-join technique.

FIG. 14 is a graphical representation of a local selection which can be incorporated into the slam-join, multi-slam-join or parallel-join techniques. A local selection chooses a subset of a table to be in a join result. Table 1401 is an example of a table upon which a local selection can be performed. Local index 1403 is a table with the RIDs of the records which satisfy the local selection condition. Symbol 1402 indicates a local selection will be performed on table 1401 using local index 1403. Table 1405 is the selection result of table 1401 with index table 1403. Only the first, third and fifth record are present in the result.

A local selection can be performed before the operation of the slam-join, multi-slam-join or parallel join techniques to create a smaller input table to be processed. The join index would thus be built on the smaller input table. Alternatively, a local selection can be performed after the join result in order to locally select the desired records in the entire join result. If the join index already exists, the local selection could be performed on the join index itself, instead of on the input or output tables. The join index is often smaller than the input table and it would take less processing time to locally select the join index. The local selection of the join index would select particular RIDs to be part of the join result. If the join index had not yet been formed, the local selection could also be a part of the formation of the join index. This again would be preferable over processing the input tables themselves because of the smaller size of the index.

An additional way to perform an efficient local selection on the first table with the slam-join and multi-slam-join techniques is to check the first-table record against a local condition when the technique reads in records from the first table records. If the local condition is not satisfied, the record will be discarded. One example of a local condition is all student names starting with the letter "K" in a student data group. Another example of a local condition is all offices on the fifth floor or above in a instructor's office data group.

Figure 15:
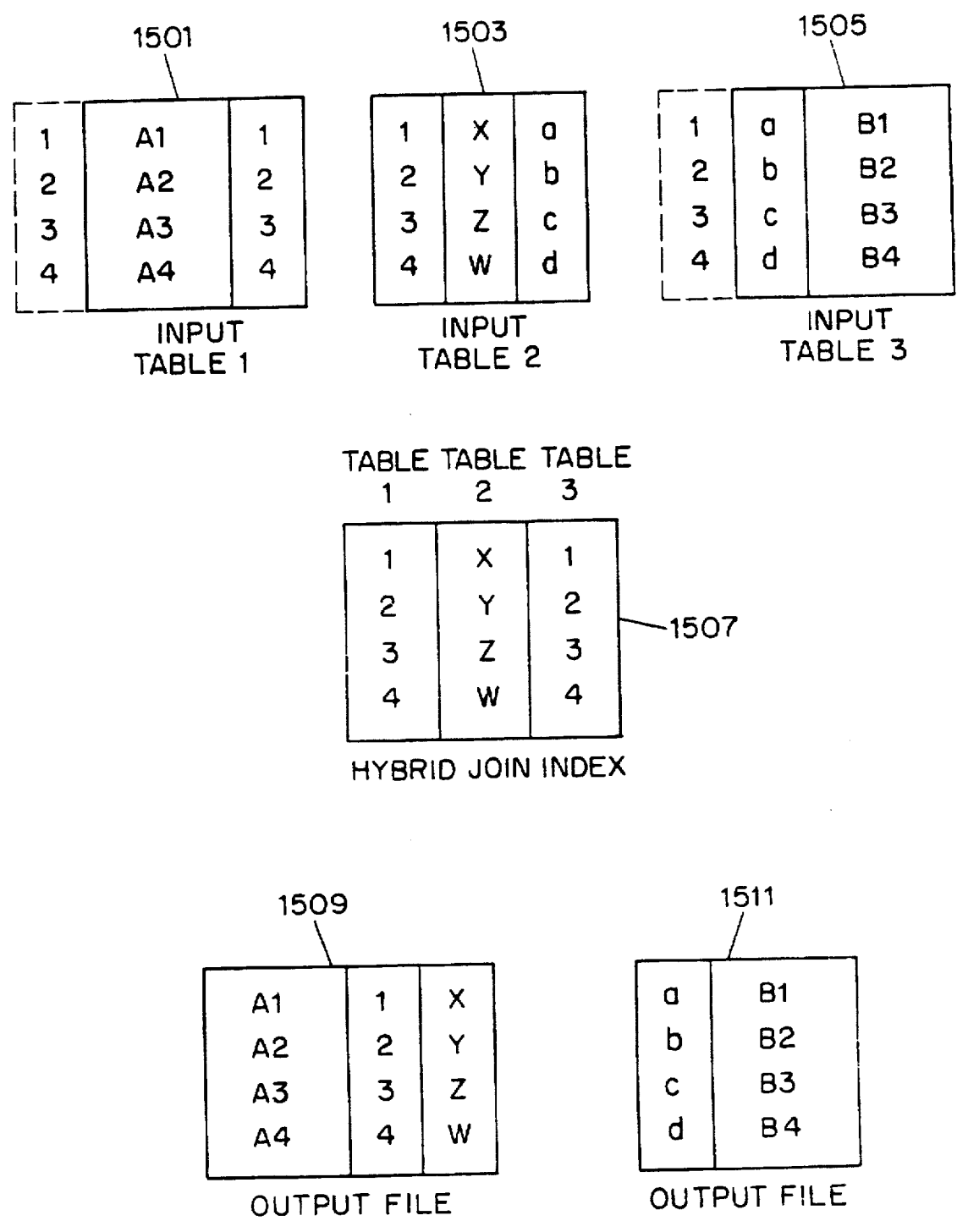

FIG. 15 is a graphical representation of a hybrid join index which can be used with the slam-join, multi-slam join and parallel-join techniques. In this example, table 1501 represents a large input table with many columns (data A contains multiple columns) which is to be joined with tables 1503 and 1505. Table 1505 is also a very large table with many columns (data B contains multiple columns). Table 1503 is a smaller table with a second column whose size (in bytes) is relatively small. In this example, table 1503 has one column of data that is not present in the other tables.

When the hybrid join index 1507 is created, the actual data stored in table 1503 will be stored in the second column of join index, rather than its RID value. To create a hybrid join index if one does not already exist, a technique similar to that described with FIG. 12 could be used. Because the data is small in table 1503, the join index will not become too large in size to create memory management problems. When a large table 1501 or 1505 is now processed, the join index column for table 1503 will simply be appended to the records of one of those tables. Thus, if the data was appended to table 1501, the output file for table 1501 would appear as output file 1509 which includes the data from table 1503. Output file 1511 would be the vertically fragmented output for table 1505.

By using a hybrid join index, I/O operations are saved for processing the data from the input table stored in the join index. The slam-join, multi-slam-join and parallel-join techniques could test the first entries in the join index for their data type or read parameter data stored in a predetermined location to determine if a hybrid join index exists.

Figure 16:
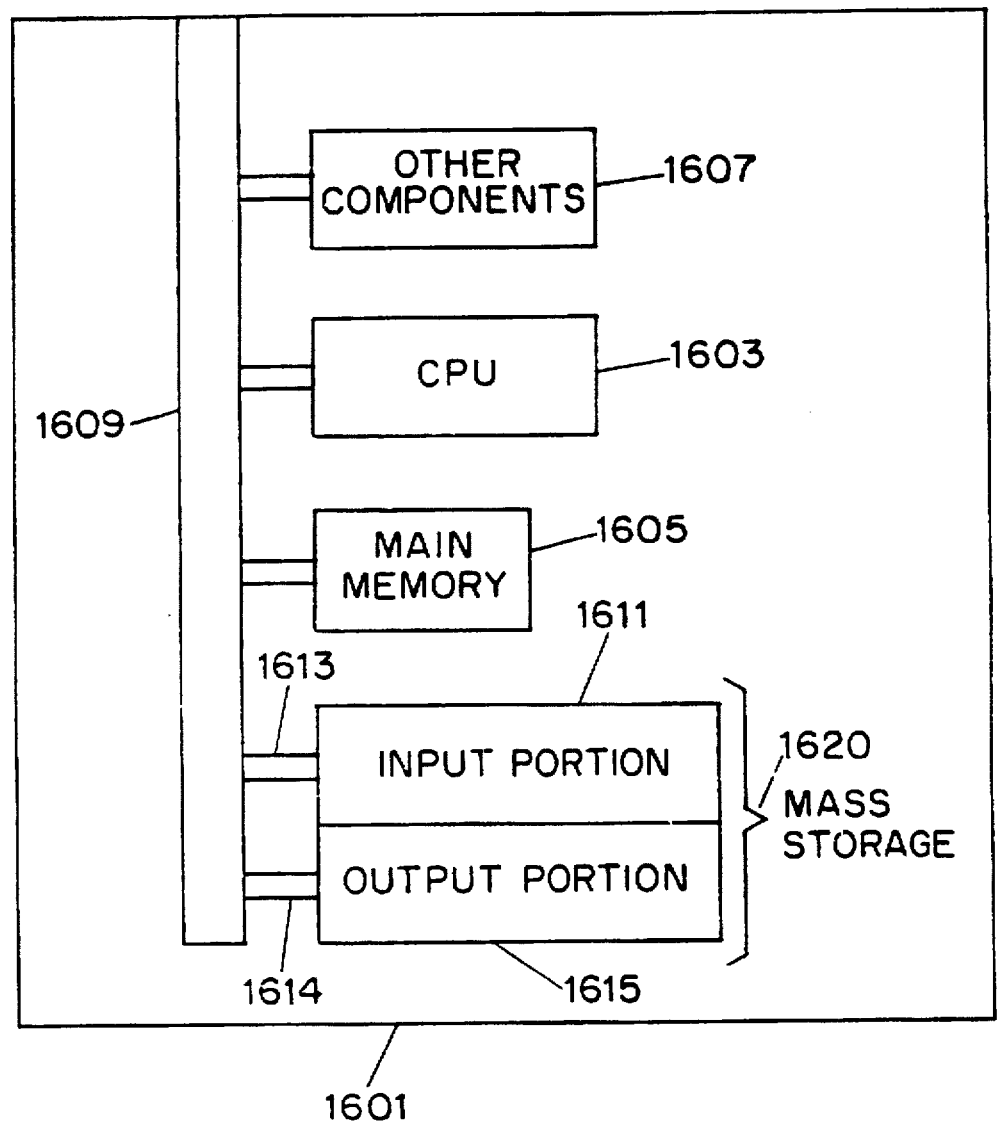
FIG. 16 is a schematic diagram of a computer system upon which the slam-join, multi-slam-join and parallel join method can be implemented effectively.

FIG. 16 shows a hardware configuration upon which the slam-join, multi-slam-join and parallel-join techniques can be implemented. Computer 1601 includes a central processing unit (CPU) 1603, a main memory 1605, a mass storage memory system 1620, other components 1607 necessary to operate computer 1601, and a databus 1609 which is coupled to each component in the computer to allow data transfer. The databus 1609 may be any physical conduit of data and may actually comprise multiple databuses connected together. Main memory 1605 could include a RAM or banks of RAM. The CPU 1603 executes a stored program routine containing computer instructions to perform the slam-join, multi-slam-join or parallel-join techniques as described in conjunction with FIGS. 1 through 15. Mass storage memory system 1620 includes an input memory portion 1611 for storing input data and an output memory portion 1615 for storing output data. The two portions 1611 and 1615 can be part of the same physical memory. Alternatively, the two portions could be physically separated and each could be located outside the computer 1601 as external storage mediums. Mass storage memory system 1620 can comprise multiple storage mediums connected together, such as multiple disks or magnetic tapes, when the amount of input data requires vast storage. Each input table could be stored on separate storage mediums. Mass storage memory system 1620 could include any type of storage medium which is capable of storing a large amount of data. Some examples of storage devices which may be used in storage system 1620 include magnetic tapes, magnetic disks, optical disks, compact disks, or any other storage medium for large amounts of information. Input memory portion 1611 contains at least two input tables to be joined. Connector 1613 connects the computer 1601 to input memory portion 1611. Processor 1603 may contain multiple CPUs to further enhance the efficiency of the operation by distributing the processing operation for each of the input tables between the processors. The distributed processing is particularly efficient in the parallel-join technique for multiple input tables because each table can be processed completely independently.

Output memory portion 1615 contains the results of the join operation. Connector 1614 couples disk 1615 to computer 1601 and allows data to be transferred to and from computer 1601 to disk 1615. Connector 1614 may be the same connector as connector 1613 which transfers data to and from the input and output memory portions if those portions are inter-connected. The output files containing the join results for each individual input tables are stored separately in output memory portion 1615. The separate storage locations are due to the vertical fragmentation used by the slam-join, multi-slam-join and parallel-join techniques. Also located in output memory portion 1615 are the temporary files which are used in the slam-join technique and contain the join index RIDs for each input table except for the first table being processed. Alternatively, the temporary files could be stored in main memory 1605.

Alternatively, multiple computers could be used to process discrete portions of the data such as the records for individual input tables. The slam-join, multi-slam-join and parallel-join techniques are easily adaptable to a distributed system. The parallel-join technique is especially easy to implement on a distributed system because each input table can be processed individually. If a computer 601 had multiple users, the available main memory would include only that portion of main memory which was allocated to the particular user performing a parallel-merge type technique.

In order to take maximum advantage of the parallel-merge type techniques' "cost" savings, available main memory 1615 is preferably smaller than at least one of the input tables stored in input memory portion 1611. This configuration will allow the slam-join, multi-slam-join and parallel-join techniques to save many I/O operations over other techniques. Each input table is read in blocks from the input memory portion 1611, processed by the CPU 1603, and written to the output memory portion 1615. Each input table is processed in this way and temporary files are created for each buffer in accordance with the parallel-merge type techniques. Temporary files, if stored in the output memory portion 1615, are read back from the output memory portion 1615 to the CPU 1603 in order to sort them and sequentially read the remaining input tables.

The slam-join and multi-slam-join techniques allow each input table to be read only once from the input memory portion 911 for the entire join operation. The selected records from each input table are written only once to the output memory portion 915. This key feature of saving I/O cycles is accomplished by the merging of the RIDs to enable sequential reading of the input tables and the vertical fragmentation which allows each input table to be processed individually. Other techniques discussed in the background section could not reduce the I/O cycles to this low level. The parallel-join technique requires reading and writing each record in all but the first table to an output file one additional time. However, extra processing time can be saved if a distributed processor system is used.

During the multi-slam-join technique, in order to select the optimal number of allocated buffers for the intermediate input tables in a given join operation, the total size of the unique records from each input table (other than the first and last) that are mentioned in the join index should be compared to the size of the available main memory. The size of the join index indicates the exact size of the join result, one record for each join index entry. However, the same input table record may be indicated multiple times in a join index but only required to be read once. Therefore, the number of buffers is related to the number of unique input table records indicated in the join index. If the number of intermediate input table unique records is five times the size of the available main memory for a given input table, then five segments will be created and an allocation condition will be derived to ensure that each segment will have an associated output file of substantially equal size after the partitioning operation is done. The number of buffers for the entire join operation will depend on the number of unique join index entries for each table other than the last in the join index. The segmentation for the first input table will depend on the number of passes that are required to read in all of the selected first table records. The size of the last table to be joined is not a factor in allocating the buffers. In a three input table example, if the selected records from the first table to be joined is four times as large as main memory, and the selected records from the second table is three times as large as main memory, then the product of the two numbers will determine the number of buffers, in this case twelve. In the case of joining three or more tables, a segment, as described above in accordance with FIG. 10, must fit into the main memory rather than a single buffer. In this example, a segment for the first table would contain three buffers while a segment for the second table would contain four buffers. No new buffers are created for the third input table. The buffers are created based on the size of available main memory, as some of the memory may be reserved for efficient sorting techniques for representing a portion of the join index or other purposes.

The partitioning values, or conditions as defined above, for each buffer associated with intermediate input tables (not the first or last input table) can be defined exactly in order to substantially equally distribute the final join result records between the buffers by reading the join index and determining the conditions based on the RID values in the join index. The relative size of the records can be taken into account. Since the join index lists all the RIDs of the records to be present in the join result for each input table, the list of unique RIDs can be apportioned almost exactly for all the buffers (or segments). A pre-processing step may be performed to read in the join index and calculate the partitioning conditions in this manner. Alternatively, if the join index must be computed, the partitioning values can be developed at the same time the join index is created. By using the join index as the source for the partitioning values, any skew created by processing the tables can be prevented. If the buffers were simply partitioned on the tables entries evenly without consulting the join index RID values, skew would occur because not every record will be read, but only the selected records that appear in the join index. Some index RIDs may also appear numerous times on the join index when there are multiple matches.

An alternative way to determine the conditions for the intermediate input tables is to sample a portion of the join index. Given that the input tables are very large for optimal use, the sample would only need to be a small portion of the entire table to statistically calculate an allocation that is close to the optimal. Sampling the join index would save both I/O and processing operations.

The multi-slam-join technique does have some memory size requirements for processing its intermediate input tables in order to achieve optimal performance during operation. Optimal operation of multi-slam-join does require a particular size of main memory for a given size of input tables to be processed. The requirement is due to the fact that a buffer or segment (made of multiple buffers) for the intermediate input tables (not the first and last) must fit into main memory all at once for processing. The required main memory can be derived with the following equations: The step of the technique of memory allocation and processing the middle input tables which must fit into main memory yields the equation:

$$y*(x+((r-1)*v)) \leq m$$

where y=the number of disk buffers; x=length of an output-file sequence in a disk buffer; r=number of tables to be joined; v=length of temporary file sequence in a disk buffer; and m=size of main memory (in blocks). An additional size constraint occurs in another step in the technique (of sorting and reading in the remaining tables) for the intermediate input tables which requires the step to occur in main memory. This constraint yields the equation:

$$(s+1)*z+(T_i*R_i) \leq K_i*m \text{ for } i=1, \ldots, r-1$$

where s=multiple of size of table required for in-memory sorting; z=size of temporary table (being processed); $T_i$=the proportion of the records in table i that participate in the join (proportion of selected records); $R_i$=the number of blocks in table i; $K_i$=number of segments for $i^{th}$ table; m=size of main memory.

Combining the above two memory constraints, and assuming all records participate in the join and all the tables are equal in size, the equations can be reduced to $$R_i \leq m * \sqrt[r-1]{m/r} \text{ for } i=1, \ldots, r-1$$

This equation produces the following chart of the maximum size for multiple input tables, except the last table, of the same size to be joined when main memory is 128 MB and disk block size equals 8 KB:

| # of input tables | Size of $R_1, R_2, \ldots R_{n-1}$ |
|---|---|
| 2 | 1,048,576 MB |
| 3 | 9,459 MB |
| 4 | 2,048 MB |
| 5 | 968 MB |

-continued

| # of input tables | Size of $R_1, R_2, \ldots R_{n-1}$ |
|---|---|
| 6 | 622 MB |
| 10 | 291 MB |
| 50 | 144 MB |

The table exhibits that the input tables can be very large compared to the size of the main memory. 128 MB is a typical size of RAM in a work-station. Larger input tables can be processed if the size of main memory increases. Smaller amounts of RAM can used to process smaller input tables. Since only selected records are read from each input table, the total size of the input table can be even greater since only the selected records will be read and processed. The size of the last input table is not constrained by memory because of the operation of the multi-slam-join technique.

The slam-join technique also has some memory size requirements in order to achieve optimal performance during operation. Optimal operation of the slam-join technique does require a particular size of main memory for a given size of input tables to be processed. The step of the technique of reading in as much as the first input table and join index as will fit into main memory yields the equation:

$$J/2 + (T_i * R_1) \leq y * m$$

where J=the size of the join index; $T_i$=the proportion of the records in table i that participate in the join (proportion of selected records); $R_1$=the number of blocks in the first table; y=the number of buffers; m=size of main memory. An additional size constraint occurs in another step in the technique (of sorting and reading in the second input table) which requires the step to occur in main memory. This constraint yields the equation:

$$y*(x+v) \leq m$$

where y=the number of disk buffers; x=length of an output-file sequence in a disk buffer; v=length of temporary file sequence in a disk buffer; and m=size of main memory (in blocks).

Combining the above two memory constraints, and since $x+v \geq 2$ should always be true, the equations can be reduced to $$m >= \sqrt{2 * |R1| * T1 + |J|}$$

The size of the second input table does not impact any memory constraint for the operation of the slam-join technique.

The memory constraints for the parallel-join technique is more relaxed than the others because each input table is processed completely independently. Therefore, each table can be partitioned into very small files to be parallel-merged.

Slam-join has been described to join two input tables at one time. The jive-join technique in the parent application can also be used to efficiently join two tables at one time, as well as join three or more table. In the two input table case, slam-join has some advantages over its jive-join counterpart. First, slam-join maximally utilizes memory in its initial phase independent of skew because it does not require an allocation pre-processing step. Instead it reads in as much of the input table and join index as will fit into memory. Additionally, slam-join is better able to adapt available main memory when a buffer partition has been completely processed. The allocated memory for the completed buffer is reallocated to the remaining buffers.

The slam-join technique is more efficient when the second input table is larger than the first due to the parallel-merge technique and the memory constraints. The jive-join technique is more efficient when the first input table is larger than the second due to the allocation scheme which is independent of the size of the first table. If the two tables are the same size, slam-join is preferable for the reasons listed above of skew handling and memory adaptiveness.

The foregoing merely illustrates the principles of the invention. It will thus be appreciated that those skilled in the art will be able to devise numerous systems, apparatus and methods which, although not explicitly shown or described herein, embody the principles of the invention and are thus within the spirit and scope of the invention as defined by its claims.

We claim:

1. A method for joining in a database system a first and second input table each comprised of records stored in a first memory using a join index, wherein said join index is indicative of records to be joined and has an index entry for each record to be included in an output resulting from said join, said method comprising the ordered steps of:
   (a) reading a portion of said join index and said first input table's records identified by said read join index into a second, relatively fast main memory;
   (b) sorting said first table's records by said second table's index entry in said read join index;
   (c) writing said read records from said first input table to separate first output files and writing said second table's index entries to separate second files;
   (d) repeating steps (a) through (c) until all portions of said join index are read;
   (e) merging said second files to identify a lowest second table index entry from said second files, wherein said lowest index entry has not yet been previously been identified during said joining method, and reading a record from said second input table that corresponds to said lowest index entry;
   (f) placing said read record in an appropriate output buffer; and
   (g) repeating steps (e) and (f) until all the join index identifiers are processed.

2. The method of claim 1, further comprising the step of writing said buffers' contents to separate third output files after step (f).

3. The method of claim 2, wherein said writing step (f) occurs when said buffer is full.

4. The method of claim 1, further comprising the step of appending said record's memory address to said second tables's corresponding index entry prior to said sorting step (b).

5. The method of claim 1, wherein each of said input tables are read only once.

6. The method of claim 1, further comprising the step of generating the join index.

7. The method of claim 1, wherein at least one of said input tables is larger than said second memory.

8. The method of claim 1, wherein said records are read as part of data blocks.

9. The method of claim 1, further including the step of locally selecting at least one of said input tables and said output files.

10. The method of claim 1, further including the step of locally selecting said join index.

11. The method of claim 1, wherein said join index further includes additional records which are included in said output files of at least one of said input tables.

12. The method of claim 1, wherein said separate output files are connected by file pointers.

13. The method of claim 1, wherein said merging step is performed using a min-heap technique.

14. The method of claim 1, further comprising the step of initially reading said join index into said second memory and sorting said join index.

15. The method of claim 1, wherein said output buffers are located in said second memory and said buffers will be unallocated if said index entry in said corresponding said output file has been merged.

16. The method of claim 1, wherein said reading step (a) reads as much of said join index and said first input table's records identified by said read index as will fit into said second memory.

17. A method for joining in a database system a plurality of input tables comprised of records stored in a first memory using a join index, wherein said join index is indicative of records to be joined and has an index entry for each record to be included in an output resulting from said join, said method comprising the steps of:

(a) reading said join index into a second, relatively faster main memory;

(b) partitioning said second memory by said index entries for one of said input tables and storing said index entries in first output files;

(c) storing said index entries' positional order in a separate temporary file;

(d) sorting said index entries in said first output files;

(e) reading in sequential order said records indicated in said index entries in said sorted first output file into said second memory;

(f) merging said index entries in said positional order of each of said first output files and identifying a lowest of said index entries not yet merged;

(g) writing said records to said output in the order of the merged index entries; and (h) repeating steps (b) through (g) for each of said input tables until all said input tables have been processed.

18. The method of claim 17, further comprising the step of identifying one of said plurality of input tables whose corresponding index entries are in numerical order and processing said identified table first.

19. The method of claim 17, further comprising the step of generating the join index.

20. The method of claim 17, wherein at least one of said input tables is larger than said second memory.

21. The method of claim 17, wherein said records are read as part of data blocks.

22. The method of claim 17, wherein said records in said output are stored in the same order as said index entries in said join index.

23. The method of claim 17, further including the step of locally selecting said join index.

24. The method of claim 17, wherein said join index further includes additional records which are included in said output files of at least one of said input tables.

25. The method of claim 17, wherein said separate output files are connected by file pointers.

26. The method of claim 17, wherein said merging step is performed using a min-heap technique.

27. The method of claim 17, wherein said order of said records in said output is based on said join index entries for said input table which is processed first.

28. The method of claim 17, wherein said second memory includes multiple memories each associated with a separate said input table.

29. A method for joining in a database system a plurality of input tables including first and last input tables comprised of records stored in a first memory using a join index, wherein said join index is indicative of records to be joined and has an index entry for each record to be included in an output resulting from said join, said method comprising the steps of:

(a) allocating an array of buffers in a second, relatively fast access memory;

(b) reading a portion of said join index and said first input table's records identified by said read join index into a second, relatively fast main memory;

(c) storing said read records read from said first input table to one of said buffers in accordance with said allocation;

(d) storing said join index entries corresponding to each of said tables other than said first table to temporary files associated with corresponding ones of said allocated buffers;

(e) repeating steps (b) through (d) until all said join index entries are processed;

(f) reading in turn said index entries in each of said temporary files except said temporary files corresponding said last input table;

(h) sequentially reading portions of said tables other than said first input table only if said portion includes a record identified in one of said sorted temporary files;

(i) writing said records in said second memory in accordance with an order of join index entries maintained in said associated temporary files to separate output files associated with each said input table;

(j) merging said temporary files corresponding to said last input table to identify a lowest remaining index entry from said last table and reading a record from said last input table that corresponds to said lowest index entry;

(k) writing said read records to separate output files;

(l) repeating steps (j) through (k) until all said index entries are processed.

30. The method of claim 29, wherein said reading step (b) reads as much of said join index and said first input table's records identified by said read index as will fit into said second memory.

31. The method of claim 29, wherein said records read in step (b) are sorted based on said last input table's index entry in said join index.

32. The method of claim 29, further comprising the step of generating the join index.

33. The method of claim 29, wherein at least one of said input tables is larger than said second memory.

34. The method of claim 29, wherein said records are read as part of data blocks.

35. The method of claim 29, further including the step of locally selecting at least one of the input and output files.

36. The method of claim 29, further including the step of locally selecting said join index.

37. The method of claim 29, wherein said join index further includes additional records which are included in said output files of at least one of said input tables.

38. The method of claim 29, wherein said separate output files are connected by file pointers.

39. The method of claim 29, wherein said merging step is performed using a min-heap technique.

40. A method for joining a plurality of input tables, including a first and last table, said input tables being comprised of records stored in a first memory in a database system, said database system including said first memory and a relatively high speed second memory having a storage capacity smaller than necessary to store at least one of said input tables, said method using a join index indicative of records to be joined and having an index entry for each record to be included in an output resulting from said join, said method comprising the steps of:

(a) reading said first table from said plurality of tables only once during said joining;

(b) separately processing said plurality of input tables other than said first table by reading said input tables into said second memory only once during said joining, wherein said processing of said last table includes a merging operation; and (c) writing join results for each one of said input tables into separate output files only once during said joining.

41. The method of claim 40, further including the step of allocating an array of buffers in said second memory for said input tables other than said last table.

42. The method of claim 40, further comprising the step of generating the join index.

43. The method of claim 40, further including the step of locally selecting at least one of said input tables and said output files.

44. The method of claim 40, further including the step of locally selecting said join index.

45. The method of claim 40, wherein said join index further includes additional records which are included in said output files of at least one of said input tables.

46. The method of claim 40, wherein said merging operation is performed using a min-heap technique.

47. A method for joining in a database system a first and second input table each comprised of records and record identifiers stored in a first memory, said method comprising the ordered steps of:

(a) reading a portion of said first input table's records and second table's record identifiers into a second, relatively fast main memory;

(b) sorting said first table records by said second table record identifiers;

(c) writing said read records from said first input table to separate first output files and said sorted second table record identifiers to separate second files;

(d) repeating steps (a) through (c) until all portions of said first table's records and said second table's record identifiers have been written;

(e) merging said second output files to identify a lowest record identifier not yet merged from said second output files and reading a record from said second input table that corresponds to said lowest record identifier;

(f) placing said read record in an appropriate output buffer; and (g) repeating steps (e) through (f) until all said record identifiers are processed.

48. The method of claim 47, wherein said writing step (f) occurs when said buffer is full.

49. The method of claim 47, wherein said reading step (a) reads as much of said join index and said first input table's records identified by said read index as will fit into said second memory.

50. The method of claim 47, wherein said database system is an object-oriented database system.

51. The method of claim 47, wherein at least one of said input tables is larger than said second memory.

52. A database system capable of performing join operations on a plurality of input tables using a join index comprising:

(a) a central processing unit;

(b) a main memory partitionable into a plurality of partitions;

(c) a storage medium separate from said main memory;

(d) a plurality of input tables stored in said storage medium;

(e) a join index stored in said storage medium indicating corresponding entries of said input tables to be joined;

(f) a plurality of output files, wherein each one of said output files corresponds to only one of said input tables;

wherein said processing unit processes said join operation by only reading each of said input tables once from said storage medium, processing said input tables in said main memory using said partitions, preforming a merging operation and writing said join operation's results for each said input table to said corresponding output files, wherein said plurality of input tables includes a last table, and said processing of said last table includes the merging operation.

53. The system in claim 52, wherein said main memory's storage capacity is smaller than at least one of said input tables stored in said storage medium.

54. The system in claim 52, wherein said join index is generated by said central processing unit prior to said join operation.

55. A database system capable of performing join operations on a plurality of input tables using a join index comprising:

(a) a central processing unit;

(b) a main memory partitionable into a plurality of partitions;

(c) a storage medium separate from said main memory;

(d) a plurality of input tables stored in said storage medium;

(e) a join index stored in said storage medium indicating corresponding entries of said input tables to be joined;

(f) a plurality of output files, wherein each one of said output files corresponds to only one of said input tables;

wherein said processing unit processes said join operation by only reading each of said input tables once from said storage medium, processing said input tables in said main memory using said partitions, preforming a merging operation and writing said join operation's results for each said input table to said corresponding output files, wherein said join operation's results are written to said corresponding output files only once.

56. A database system capable of performing join operations on a plurality of input tables using a join index comprising:

(a) a central processing unit;

(b) a main memory partitionable into a plurality of partitions;

(c) a storage medium separate from said main memory;

(d) a plurality of input tables stored in said storage medium;

(e) a join index stored in said storage medium indicating corresponding entries of said input tables to be joined;

(f) a plurality of output files, wherein each one of said output files corresponds to only one of said input tables;

wherein said processing unit processes said join operation by only reading each of said input tables once from said storage medium, processing said input tables in said main memory using said partitions, preforming a merging operation and writing said join operation's results for each said input table to said corresponding output files, wherein said merging operation is performed using a min-heap structure.

57. A method for joining in a database system a plurality of input tables, including a first and last input table, each said input table comprised of records stored in a first memory using a join index, wherein said join index is indicative of records to be joined and has an index entry for each record to be included in an output resulting from said join, said method comprising the steps of:

(a) repeatedly reading a portion of said join index and said first input table's records identified in said read join index into a second, relatively fast main memory;

(b) merging said index entries of at least one of said input tables to store said merged index entries corresponding records in the proper order for said join output; and (c) writing said corresponding records to separate output files for each of said input tables.

58. The method of claim 57, wherein each of said input tables are read only once.

59. The method of claim 57, wherein said reading step (a) reads as much of said join index and said first input table's records identified by said read index as will fit into said second memory.

60. The method of claim 57, further comprising the step of generating the join index.

61. The method of claim 57, wherein at least one of said input tables is larger than said second memory.

62. The method of claim 57, wherein said records are read as part of data blocks.

63. The method of claim 57, further including the step of locally selecting at least one of said input tables and said output files.

64. The method of claim 57, further including the step of locally selecting said join index.

65. The method of claim 57, wherein said join index further includes additional records which are included in said output files of at least one of said input tables.

66. The method of claim 57, wherein said merging step is performed using a min-heap technique.

* * * * *